US011815936B2

(12) United States Patent
Roy et al.

(10) Patent No.: US 11,815,936 B2
(45) Date of Patent: Nov. 14, 2023

(54) PROVIDING CONTEXTUALLY-RELEVANT DATABASE CONTENT BASED ON CALENDAR DATA

(71) Applicant: MicroStrategy Incorporated, Vienna, VA (US)

(72) Inventors: Abhijeet Roy, South Riding, VA (US); Hui Yuan, Fairfax, VA (US); Nida Imtiaz, Vienna, VA (US); Timothy Lang, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 149 days.

(21) Appl. No.: 16/248,659

(22) Filed: Jan. 15, 2019

(65) Prior Publication Data

US 2020/0065307 A1 Feb. 27, 2020

Related U.S. Application Data

(60) Provisional application No. 62/720,955, filed on Aug. 22, 2018.

(51) Int. Cl.
*G06F 9/451* (2018.01)
*G06F 3/048* (2013.01)
(Continued)

(52) U.S. Cl.
CPC .......... *G06F 9/451* (2018.02); *G06F 3/04842* (2013.01); *G06F 16/248* (2019.01);
(Continued)

(58) Field of Classification Search
CPC ................. G06F 9/451; G06F 16/9558; G06F 16/24575; G06F 16/248; G06F 40/205;
(Continued)

(56) References Cited

U.S. PATENT DOCUMENTS 6,006,242 A 12/1999 Poole et al.
6,209,005 B1 3/2001 Harker et al.
(Continued)

FOREIGN PATENT DOCUMENTS

GB 2354851 4/2001

OTHER PUBLICATIONS

"Screenshots Showing Example of Grammarly Web Browser Extension", Aug. 19, 2019, 2 pages.
(Continued)

*Primary Examiner* — Hares Jami

(74) *Attorney, Agent, or Firm* — Fish & Richardson P.C.

(57) ABSTRACT

Methods, systems, and apparatus, including computer programs stored on computer-readable media, for providing contextually-relevant database content. Techniques are described for monitoring conditions of a computing device and detecting when database content is relevant to a current context of the computing device. In some implementations, a first computing device is monitored to detect actions of the first computing device that involve calendar data for a user. In response, a determination that text corresponding to the calendar appointment includes a term associated with a particular entity is made. Data for a user information card including information related to the particular entity is obtained. The first computing device is then caused to display the user information card or an interactive control configured to initiate display of the user information card.

17 Claims, 6 Drawing Sheets

(51) Int. Cl.
*G06F 16/955* (2019.01)
*G06F 3/04842* (2022.01)
*G06F 40/205* (2020.01)
*G06F 16/2457* (2019.01)
*G06F 16/248* (2019.01)
*G06F 40/295* (2020.01)
*G06F 21/62* (2013.01)
*H04L 67/60* (2022.01)
*G06F 3/0481* (2022.01)
*H04L 67/306* (2022.01)
*H04L 67/01* (2022.01)

(52) U.S. Cl.
CPC .... *G06F 16/24575* (2019.01); *G06F 16/9558* (2019.01); *G06F 21/62* (2013.01); *G06F 40/205* (2020.01); *G06F 40/295* (2020.01); *H04L 67/60* (2022.05); *G06F 3/0481* (2013.01); *H04L 67/01* (2022.05); *H04L 67/306* (2013.01)

(58) Field of Classification Search
CPC .... G06F 40/295; G06F 3/04842; G06F 21/62; G06F 3/0481; H04L 67/306; H04L 67/42
See application file for complete search history.

(56) References Cited

U.S. PATENT DOCUMENTS

| | | |
|---|---|---|
| 6,584,479 B2 | 6/2003 | Chang et al. |
| 7,130,841 B1 | 10/2006 | Goel et al. |
| 7,630,965 B1 | 12/2009 | Erickson et al. |
| 7,640,511 B1 | 12/2009 | Keel et al. |
| 7,673,282 B2 | 3/2010 | Amaru et al. |
| 7,747,648 B1 | 6/2010 | Kraft et al. |
| 7,827,527 B1 | 11/2010 | Chiluvuri |
| 8,041,711 B2 | 10/2011 | Walker et al. |
| 8,413,045 B2 | 4/2013 | Lemonik et al. |
| 8,539,336 B2 | 9/2013 | Griffiths et al. |
| 8,745,718 B1 | 6/2014 | Dufel et al. |
| 8,761,463 B2 | 6/2014 | Cheswick |
| 8,782,552 B2 | 7/2014 | Batman et al. |
| 8,898,595 B2 | 11/2014 | Cragun et al. |
| 9,070,182 B1 | 6/2015 | Chua et al. |
| 9,165,406 B1 | 10/2015 | Gray et al. |
| 9,412,208 B2 | 8/2016 | Greenberg et al. |
| 9,582,154 B2 | 2/2017 | Greenberg et al. |
| 9,582,913 B1 | 2/2017 | Kraft et al. |
| 9,710,123 B1* | 7/2017 | Gray .............. G06F 1/1694 |
| 10,051,107 B1* | 8/2018 | Prasad ............ H04W 68/005 |
| 10,169,427 B2 | 1/2019 | Aaron et al. |
| 10,318,995 B2 | 6/2019 | King et al. |
| 10,503,821 B2 | 12/2019 | Brunswig et al. |
| 10,554,590 B2 | 2/2020 | Cabrera-Cordon et al. |
| 10,691,314 B1 | 6/2020 | Freeman et al. |
| 10,848,482 B1 | 11/2020 | Eisen et al. |
| 10,885,099 B1 | 1/2021 | Price et al. |
| 10,902,344 B1 | 2/2021 | Kenthapadi et al. |
| 10,915,455 B2 | 2/2021 | Jayaraman et al. |
| 11,003,323 B1 | 4/2021 | Fan et al. |
| 11,048,768 B1 | 6/2021 | Kolbert et al. |
| 11,120,057 B1 | 9/2021 | McNabney et al. |
| 11,120,218 B2 | 9/2021 | Ray et al. |
| 11,138,518 B1 | 10/2021 | Yu et al. |
| 11,176,139 B1 | 11/2021 | Li et al. |
| 11,194,717 B2 | 12/2021 | Soini et al. |
| 11,238,210 B2 | 2/2022 | Ziraknejad et al. |
| 11,288,637 B2 | 3/2022 | Pena et al. |
| 11,460,976 B2 | 10/2022 | Fan et al. |
| 11,494,372 B2 | 11/2022 | Rigney et al. |
| 11,500,655 B2 | 11/2022 | Ziraknejad et al. |
| 11,501,016 B1 | 11/2022 | Peterson et al. |
| 11,501,736 B2 | 11/2022 | Notani et al. |
| 11,561,968 B2 | 1/2023 | Nocedal et al. |
| 11,562,044 B1 | 1/2023 | Du et al. |
| 2002/0052861 A1 | 5/2002 | Gustman |
| 2002/0160805 A1 | 10/2002 | Laitinen et al. |
| 2002/0186867 A1 | 12/2002 | Gutta et al. |
| 2004/0080532 A1 | 4/2004 | Cragun et al. |
| 2004/0093349 A1 | 5/2004 | Buinevicius et al. |
| 2004/0168171 A1 | 8/2004 | Comparato et al. |
| 2004/0172616 A1 | 9/2004 | Rothschiller et al. |
| 2004/0230447 A1 | 11/2004 | Schwerin-Wenzel et al. |
| 2004/0249659 A1 | 12/2004 | Schwerin-Wenzel et al. |
| 2005/0041863 A1 | 2/2005 | Ray et al. |
| 2006/0047646 A1 | 3/2006 | Maluf et al. |
| 2006/0065707 A1 | 3/2006 | Kanatani et al. |
| 2006/0184425 A1 | 8/2006 | Hanechak et al. |
| 2006/0293904 A1 | 12/2006 | Ramanathan et al. |
| 2007/0040813 A1 | 2/2007 | Kushler et al. |
| 2007/0057037 A1 | 3/2007 | Woronec |
| 2007/0157076 A1 | 7/2007 | Lin et al. |
| 2007/0174350 A1 | 7/2007 | Pell et al. |
| 2007/0174761 A1 | 7/2007 | Lin et al. |
| 2007/0180377 A1* | 8/2007 | Gittelman ............ G06Q 10/109 715/703 |
| 2007/0271376 A1* | 11/2007 | Yach ................. H04M 1/72436 709/224 |
| 2007/0280179 A1 | 12/2007 | Van Belle et al. |
| 2008/0005659 A1 | 1/2008 | Fujimaki |
| 2008/0021860 A1 | 1/2008 | Wiegering et al. |
| 2008/0086455 A1 | 4/2008 | Meisels et al. |
| 2008/0086700 A1 | 4/2008 | Rodriguez et al. |
| 2008/0104052 A1 | 5/2008 | Ryan et al. |
| 2008/0104501 A1 | 5/2008 | Sattler et al. |
| 2008/0195659 A1 | 8/2008 | Rawle |
| 2008/0209329 A1 | 8/2008 | DeFranco et al. |
| 2008/0243834 A1 | 10/2008 | Rieman et al. |
| 2008/0258881 A1 | 10/2008 | Manson et al. |
| 2008/0294624 A1 | 11/2008 | Kanigsberg et al. |
| 2009/0018996 A1 | 1/2009 | Hunt et al. |
| 2009/0100323 A1 | 4/2009 | Walls et al. |
| 2009/0158200 A1* | 6/2009 | Palahnuk ........... G06Q 30/0252 715/781 |
| 2009/0164564 A1 | 6/2009 | Willis |
| 2009/0221268 A1* | 9/2009 | Yach .................... H04M 1/575 455/414.1 |
| 2009/0228918 A1 | 9/2009 | Rolff et al. |
| 2010/0017478 A1 | 1/2010 | Mejia et al. |
| 2010/0095240 A1 | 4/2010 | Shiplacoff et al. |
| 2010/0138271 A1 | 6/2010 | Henkin et al. |
| 2010/0174998 A1* | 7/2010 | Lazarus ............... G06Q 10/109 715/751 |
| 2010/0176194 A1 | 7/2010 | Hodgkinson et al. |
| 2010/0228624 A1 | 9/2010 | Morris et al. |
| 2010/0278453 A1 | 11/2010 | King |
| 2011/0026778 A1 | 2/2011 | Ye |
| 2011/0033036 A1 | 2/2011 | Edwards et al. |
| 2011/0055250 A1 | 3/2011 | Nandy et al. |
| 2011/0119165 A1 | 5/2011 | Zee |
| 2011/0196851 A1 | 8/2011 | Vadlamani et al. |
| 2011/0246880 A1 | 10/2011 | Horton et al. |
| 2012/0054211 A1 | 3/2012 | Arsenault et al. |
| 2012/0084340 A1* | 4/2012 | McCormack ....... G06Q 10/0637 709/203 |
| 2012/0131451 A1 | 5/2012 | Abe |
| 2012/0144286 A1 | 6/2012 | Bank et al. |
| 2012/0203753 A1 | 8/2012 | Biran et al. |
| 2012/0212337 A1 | 8/2012 | Montyne et al. |
| 2012/0233256 A1 | 9/2012 | Shaham et al. |
| 2012/0254369 A1 | 10/2012 | Gillard et al. |
| 2012/0265736 A1 | 10/2012 | Williams et al. |
| 2012/0265779 A1 | 10/2012 | Hsu et al. |
| 2012/0278164 A1 | 11/2012 | Spivack |
| 2012/0278305 A1 | 11/2012 | Wei et al. |
| 2013/0031453 A1 | 1/2013 | Griffiths et al. |
| 2013/0031454 A1 | 1/2013 | Griffiths et al. |
| 2013/0031457 A1 | 1/2013 | Griffiths et al. |
| 2013/0046544 A1 | 2/2013 | Kay et al. |
| 2013/0054617 A1 | 2/2013 | Colman |
| 2013/0117287 A1 | 5/2013 | Jagota et al. |
| 2013/0117653 A1 | 5/2013 | Sukhanov et al. |
| 2013/0159848 A1 | 6/2013 | Banke et al. |
| 2013/0179209 A1 | 7/2013 | Milosevich |

(56) References Cited

U.S. PATENT DOCUMENTS

| | | |
|---|---|---|
| 2013/0275120 A1 | 10/2013 | DeGross |
| 2013/0283194 A1 | 10/2013 | Kopp et al. |
| 2013/0325839 A1 | 12/2013 | Goddard et al. |
| 2013/0332962 A1 | 12/2013 | Moritz et al. |
| 2013/0344468 A1 | 12/2013 | Lindsay et al. |
| 2014/0046976 A1 | 2/2014 | Zhang et al. |
| 2014/0115070 A1 | 4/2014 | Virtanen et al. |
| 2014/0115456 A1 | 4/2014 | White et al. |
| 2014/0122289 A1 | 5/2014 | Beck |
| 2014/0143202 A1* | 5/2014 | Rekula .................. G06F 16/907 707/610 |
| 2014/0149896 A1* | 5/2014 | Los .................... G06Q 10/1095 715/764 |
| 2014/0172418 A1 | 6/2014 | Puppin |
| 2014/0172870 A1 | 6/2014 | Wang et al. |
| 2014/0173501 A1 | 6/2014 | Wu |
| 2014/0177819 A1 | 6/2014 | Vymenets et al. |
| 2014/0218385 A1 | 8/2014 | Carmi |
| 2014/0229462 A1 | 8/2014 | Lo |
| 2014/0236978 A1 | 8/2014 | King et al. |
| 2014/0278349 A1 | 9/2014 | Grieves et al. |
| 2014/0304103 A1 | 10/2014 | Barton et al. |
| 2014/0304365 A1 | 10/2014 | Khanna |
| 2014/0334721 A1 | 11/2014 | Cervin et al. |
| 2014/0365395 A1 | 12/2014 | Arguelles et al. |
| 2014/0365944 A1 | 12/2014 | Moore et al. |
| 2015/0006564 A1 | 1/2015 | Tomkins et al. |
| 2015/0012279 A1 | 1/2015 | Kim et al. |
| 2015/0019221 A1 | 1/2015 | Lee et al. |
| 2015/0074138 A1 | 3/2015 | Nam et al. |
| 2015/0082219 A1 | 3/2015 | Beck et al. |
| 2015/0085146 A1 | 3/2015 | Khemkar |
| 2015/0160806 A1 | 6/2015 | Fey et al. |
| 2015/0180875 A1 | 6/2015 | Kay |
| 2015/0189347 A1 | 7/2015 | Oztaskent et al. |
| 2015/0213074 A1 | 7/2015 | Varakin et al. |
| 2015/0356085 A1 | 12/2015 | Panda et al. |
| 2016/0044132 A1 | 2/2016 | Croft |
| 2016/0048698 A1 | 2/2016 | Sahu et al. |
| 2016/0070686 A1 | 3/2016 | Yu et al. |
| 2016/0103883 A1 | 4/2016 | Ramani et al. |
| 2016/0104200 A1 | 4/2016 | Osotio et al. |
| 2016/0117593 A1 | 4/2016 | London |
| 2016/0117782 A1 | 4/2016 | Stibel et al. |
| 2016/0124924 A1 | 5/2016 | Greenberg et al. |
| 2016/0124928 A1 | 5/2016 | Fink et al. |
| 2016/0132970 A1 | 5/2016 | Greenberg et al. |
| 2016/0140109 A1 | 5/2016 | Kim et al. |
| 2016/0170981 A1 | 6/2016 | Morimoto et al. |
| 2016/0188719 A1 | 6/2016 | Glover et al. |
| 2016/0210734 A1 | 7/2016 | Kass et al. |
| 2016/0261658 A1 | 9/2016 | Taylor et al. |
| 2016/0294755 A1 | 10/2016 | Prabhu |
| 2016/0352891 A1 | 12/2016 | Niu et al. |
| 2016/0379117 A1 | 12/2016 | Faaborg |
| 2017/0046180 A1 | 2/2017 | Desineni et al. |
| 2017/0097926 A1 | 4/2017 | Ben-Tzur |
| 2017/0104957 A1 | 4/2017 | Farrell |
| 2017/0109334 A1 | 4/2017 | Anglin et al. |
| 2017/0178144 A1 | 6/2017 | Follet et al. |
| 2017/0185686 A1 | 6/2017 | Levi et al. |
| 2017/0188213 A1 | 6/2017 | Nirantar et al. |
| 2017/0243132 A1 | 8/2017 | Sainani et al. |
| 2017/0308291 A1 | 10/2017 | Luipold |
| 2017/0315711 A1 | 11/2017 | Adams |
| 2017/0329466 A1 | 11/2017 | Krenkler et al. |
| 2017/0330195 A1 | 11/2017 | Lange et al. |
| 2017/0361233 A1 | 12/2017 | Stirling et al. |
| 2017/0366579 A1 | 12/2017 | Aguiar et al. |
| 2018/0013844 A1 | 1/2018 | Foged et al. |
| 2018/0020076 A1 | 1/2018 | Porwal |
| 2018/0060302 A1 | 3/2018 | Liang et al. |
| 2018/0092547 A1 | 4/2018 | Tzvieli et al. |
| 2018/0113865 A1 | 4/2018 | Najork et al. |
| 2018/0129941 A1 | 5/2018 | Gustafson et al. |
| 2018/0190274 A1 | 7/2018 | Kirazci et al. |
| 2018/0218042 A1 | 8/2018 | Krishnan et al. |
| 2018/0225341 A1 | 8/2018 | Merg et al. |
| 2018/0318719 A1 | 11/2018 | Ma et al. |
| 2018/0329878 A1 | 11/2018 | Hirzel et al. |
| 2018/0336641 A1 | 11/2018 | Dziabiak et al. |
| 2018/0337967 A1 | 11/2018 | Ritchie et al. |
| 2018/0350144 A1 | 12/2018 | Rathod |
| 2019/0035403 A1 | 1/2019 | Ramasamy et al. |
| 2019/0042601 A1 | 2/2019 | Ashe |
| 2019/0042988 A1 | 2/2019 | Brown et al. |
| 2019/0057165 A1 | 2/2019 | Rosen et al. |
| 2019/0073350 A1 | 3/2019 | Shiotani |
| 2019/0080416 A1 | 3/2019 | Smith et al. |
| 2019/0130468 A1 | 5/2019 | Lerman et al. |
| 2019/0164063 A1 | 5/2019 | Moura et al. |
| 2019/0164313 A1 | 5/2019 | Ma et al. |
| 2019/0197916 A1 | 6/2019 | Park |
| 2019/0220867 A1 | 7/2019 | Karani et al. |
| 2019/0236205 A1 | 8/2019 | Jia et al. |
| 2019/0297186 A1 | 9/2019 | Karani |
| 2019/0392024 A1 | 12/2019 | Singh et al. |
| 2020/0005117 A1 | 1/2020 | Yuan et al. |
| 2020/0029113 A1 | 1/2020 | Dacus et al. |
| 2020/0043019 A1 | 2/2020 | Hadavand et al. |
| 2020/0065122 A1 | 2/2020 | Ziraknejad et al. |
| 2020/0065342 A1 | 2/2020 | Panuganty |
| 2020/0065791 A1 | 2/2020 | Patil et al. |
| 2020/0126540 A1 | 4/2020 | Panchamgam et al. |
| 2020/0143102 A1 | 5/2020 | Ziraknejad et al. |
| 2020/0160612 A1 | 5/2020 | Bowen |
| 2020/0186836 A1 | 6/2020 | Milanfar et al. |
| 2020/0192965 A1 | 6/2020 | Imtiaz et al. |
| 2020/0251111 A1 | 8/2020 | Temkin et al. |
| 2020/0327564 A1 | 10/2020 | Simard et al. |
| 2020/0387550 A1 | 12/2020 | Cappetta et al. |
| 2020/0389317 A1 | 12/2020 | Dunjic et al. |
| 2020/0394265 A1 | 12/2020 | Ray et al. |
| 2020/0395001 A1 | 12/2020 | Mohanty et al. |
| 2020/0395016 A1 | 12/2020 | Kapila et al. |
| 2020/0401580 A1 | 12/2020 | Fitzpatrick et al. |
| 2020/0401593 A1 | 12/2020 | Panuganty et al. |
| 2021/0073874 A1 | 3/2021 | Wish |
| 2021/0081902 A1 | 3/2021 | Pena et al. |
| 2021/0084032 A1 | 3/2021 | Ding et al. |
| 2021/0117664 A1 | 4/2021 | Rizvi et al. |
| 2021/0133269 A1 | 5/2021 | Shah et al. |
| 2021/0141794 A1 | 5/2021 | Picorel et al. |
| 2021/0142763 A1 | 5/2021 | Notani et al. |
| 2021/0149906 A1 | 5/2021 | Li et al. |
| 2021/0201916 A1 | 7/2021 | Touret et al. |
| 2021/0224345 A1 | 7/2021 | Shah et al. |
| 2021/0240759 A1 | 8/2021 | Hwang et al. |
| 2021/0240773 A1 | 8/2021 | Chen et al. |
| 2021/0248135 A1 | 8/2021 | Rigney et al. |
| 2021/0263916 A1 | 8/2021 | Niu et al. |
| 2021/0271727 A1 | 9/2021 | Fan et al. |
| 2021/0278938 A1 | 9/2021 | Fan et al. |
| 2021/0342338 A1 | 11/2021 | Nocedal et al. |
| 2021/0357378 A1 | 11/2021 | Urdiales et al. |
| 2022/0222418 A1 | 7/2022 | Ziraknejad et al. |
| 2023/0008424 A1 | 1/2023 | Rigney et al. |
| 2023/0029927 A1 | 2/2023 | Ziraknejad et al. |

OTHER PUBLICATIONS

Community.microstrategy.com [online] "Amazon's Alexa: Key Analytics Applications That Deliver Voice-activated Reporting," May 2017, retrieved on May 21, 2020, retrieved from URL < https://community.microstrategy.com/s/article/Amazon-s-Alexa-Key-Analytics-Applications-That-Deliver-Voice-activated-Reporting?language=en_US>, 4 pages.

Community.microstrategy.com [online], "How to Implement Voice-controlled Data Analytics With Amazon's Alexa", May 2017, retrieved on May 21, 2020, retrieved from URL <https://community.microstrategy.com/s/article/How-to-Implement-Voice-controlled-Data-Analytics-With-Amazon-s-Alexa?language=en_US>, 3 pages.

(56) References Cited

OTHER PUBLICATIONS

Community.microstrategy.com [online], "HyperVoice and HyperVision." Feb. 2019, retrieved on May 21, 2020, retrieved from URL <https://community.microstrategy.com/s/question/0D544000073QxyCCAS/hypervoice-and-hypervision?language=en_US>.
Community.microstrategy.com [online], "What is MicroStrategy HyperIntelligence?," 2019, retrieved on May 21, 2020, retrieved from URL <https://community.microstrategy.com/s/article/KB442388-What-is-MicroStrategy-HyperIntelligence?language=en_US> 12 pages.
Doughenschen.com [online], "MicroStrategy Embeds Analytics Into Any Web Interface" Feb. 2019, retrieved on May 21, 2020, retrieved from UR: <https://doughenschen.com/2019/02/10/microstrategy-embeds-analytics-into-any-web-interface/>, 6 pages.
Eweek.com [online], "MicroStrategy Streamlines Analytics With 'Zero Clicks' UI," Jan. 2019, retrieved on May 21, 2020, retrieved from URL<https:/7www.eweek.com/enterprise-apps/microstrategy-streamlines-analytics-with-zero-clicks-ui.
Idevnews.com [online], "MicroStrategy 2019 Brings AI/ML & Sematic Technologies to BI, Analytics," Feb. 2019, retrieved on May 21, 2020, retrieved from URL <https://www.idevnews.com/stories/7248/MicroStrategy-2019-Brings-AIML-Sematic-Technologies-to-BI-Analytics>, 3 pages.
Lippens, "Amazon's Alexa: Key Analytics Applications That Deliver VoiceActivated Reporting," May 2017, MicroStrategy, 23 pages.
Lippens, "Your Voice is Your Passport: Implementing Voice-driven Applications with Amazon Alexa," 2017, Microstrategy, 33 pages.
Lippens., "How to Implement Voice-Controlled Data Analytics With Amazon's Alexa," May 2017, MicroStrategy, 4 pages.
Microstrategy.com [online], "7 Trending Technology Sessions You Won't Want to Miss at MicroStrategy World 2019," Dec. 2018, retrieved on May 21, 2020, retrieved from URL <https://www.microstrategy.com/us/resources/blog/bi-trends/seven-trending-technology-sessions-at-microstrateg>, 10 pages.
Micfrostrategy.com [online], "Microstrategy 2019, The Platform for The Intelligent Enterprise" May 2019, retrieved on May 22, 2020, retrieved from URL <https://www.microstrategy.com/getmedia/4b9bd76-952b-4da5-818d-489278abd59c/MicroStrategy-2019-whitepaper>, 14 pages.
Microstrategy.com [online], "Build and Deploy HyperCards Using Workstation," Feb. 2019, retrieved on May 21, 2020, retrieved from URL <https://www.microstrategy.com/getmedia/8103159b-3416-4a33-bd6a-2e99c9afd474/Build-and-Deploy-HyperCards-Using-Workstation, 30 pages.
Microstrategy.com, [online], "Whats New in Microstrategy 2019", 2019, retrieved on May 21, 2020, retrieved from URL <https://www.microstrategy.com/getmedia/de71bdb6-6d88-4e62-90d5-0e4a3cf94bb6/whats-new-in-microstrategy-2019>, 138 pages.
Prnewswire.com "MicroStrategy 2019, die World's Most Advanced Analytics & Mobility Platform, Powers Decisions for Every Moment of the Day" Jan. 2019, retrieved on May 21, 2020, retrieved from URL <https://www.prnewswire.com/in/news-releases/microstrategy-2019-the-world-s-most-advanced-analytics-amp-mobility-platform-powers-decisions-for-every-moment-of-the-day-867142447.html>.
Zdnet.com [online], "MicroStrategy 2019 introduces "HyperIntelligence" contextual BI," Jan. 2019, retrieved on May 21, 2020, retrieved from URL <https://www.zdnet.com/article/microstrategy-2019-brings-introduces-hyperintelligence-contextual-bi/>. 6 pages.
U.S Office Action in U.S. Appl. No. 16/730,417, dated Aug. 4, 2020, 22 pages.
Constellationr.com [online], "MicroStrategy Embeds Analytics Into Any Web Interlace" Feb. 12, 2019, retrieved on Jan. 15, 2020, retrieved from URL <https://www.constellationr.com/blog-news/microstrategy-embeds-analytics-any-web-interface>, 8 pages.
Css-tricks.com [online], "Extracting Text from Content Using HTML Slot, HTML Template and Shadow DOM," Mar. 6, 2019, retrieved on Jan. 15, 2020, retrieved from URL <https://css-tricks.com/extracting-text-from-content-using-html-slot-html-template-and-shadow-dom/>, 6 pages.

Developer.mozilla.org [online], "High-level view," Jan. 29, 2018, retrieved on Jan. 15, 2020, retrieved from URL < https://wiki.developer.mozilla.org/en-US/docs/Web/Web_Components/Using_shadow_DOMSrevision/1352031>, 6 pages.
Forbes.com [online], "These Ex-Israeli Surveillance Agents Hijack Your Browser to Profit From Ads," Jun. 9, 2015, retrieved on Jan. 15, 2020, retrieved from URL <https://www.forbes.com/sites/thomasbrewster/2015/06/09/from-israel-unit-8200-to-ad-men/#3ff26d7926e2>, 11 pages.
Github.com [online], "Non-invasive way of making highlights—maybe with an overlay? #291," Nov. 30, 2013, retrieved on Jan. 15, 2020, retrieved from URL <https://github.com/openannotation/annotator/issues/291 >, 19 pages.
Github.com [online], "Textus," Oct. 27, 2012, retrieved on Jan. 15, 2020, retrieved from URL <https://github.com/okfn/textus>.
Glazkov.com [online], "What the Heck is Shadow DOM?," Jan. 14, 2011, retrieved on Jan. 15, 2020, retrieved from URL <https://glazkov.com/2011/01/14/what-the-heck-is-shadow-dom/>, 43 pages.
Medium.com [online], "Steps to Understanding the Shadow DOM," Feb. 22, 2019, retrieved on Jan. 15, 2020, retrieved from URL <https://medium.com/quick-code/understanding-the-shadow-dom-20e691cc611b>, 22 pages.
Microstrategy.com [online], "HyperIntelligence", available on or before Jan. 15, 2019, retrieved on Jan. 15, 2020, retrieved from URL <https://www.microstrategy.com/us/product/hyperintelligence>, 3 pages.
Nicolasleroy.fr [online]. "TheFind launches price comparison service", Nov. 19, 2009, retrieved on May 14, 2012, retrieved from URL <http://www.nicolasleroy.fr/wp/2009/11/thefind-launches-price-comparison-service/ >, 6 pages.
Robdodson.me [online], "Shadow DOM: JavaScript," Sep. 2, 2013, retrieved Jan. 15, 2020, retrieved from URL <https://robdodson.me/shadow-doni-javascript/>, 11 pages.
Solutionsreview.com [online], "MicroStrategy 2019 Features New HyperCards and Federated Analytics," Jan. 7, 2019, retrieved on Jan. 15, 2020, retrieved from URL <https://solutionsreview.com/business-intelligence/microstrategy-2019-features-new-hypercards-and-federated-analytics/>, 4 pages.
Solutionsreview.com [online], "MicroStrategy Extends HyperIntelligence with New Platform Update," Jul. 1, 2019, retrieved on Jan. 15, 2020, retrieved from URL <https://solutionsreview.com/business-intelligence/microstrategy-extends-hyperintelligence-with-new-platform-update/>, 4 pages.
Vibrantmedia.com [online], "FAQs: Vibrant In-Text Advertising." retrieved on Mar. 31, 2011, retrieved from URL <http://www.vibrantmedia.com/in-text_advertising/faq.asp>, 2 pages.
Vibrantmedia.com [online], "In-Text Demo," retrieved on Mar. 31, 2011, retrieved from URL <http://www.vibrantmedia.com/in-text_advertising/demo.asp>, 2 pages.
Wikipedia.com [online], "In-text advertising", Mar. 2017, retrieved on Jan. 15, 2020, retrieved from URL <https://en.wikipedia.org/w/index.php?title=In-text_advertising&oldid=770109369>, 2 pages.
Wikipedia.com [online], "Web Components," Dec. 2017, retrieved on Jan. 15, 2020, retrieved from URL <https://en.wikipedia.org/w/index.php?title=We_Components&oldid=815726999>, 5 pages.
U.S. Notice of Allowance in U.S. Appl. No. 16/788,530, dated Feb. 22, 2021, 12 pages.
U.S. Office Action in U.S. Appl. No. 16/247,892, dated Jan. 13, 2020, 20 pages.
U.S. Office Action in U.S. Appl. No. 16/247,892, dated Jun. 4, 2020, 26 pages.
U.S. Office Action in U.S. Appl. No. 16/247,892, dated Mar. 10, 2021, 29 pages.
U.S. Office Action in U.S. Appl. No. 16/730,417, dated Feb. 11, 2021, 19 pages.
U.S. Office Action in U.S. Appl. No. 16/788,530, dated Jun. 25, 2020, 21 pages.
U.S. Office Action in U.S. Appl. No. 16/723,413, dated Dec. 29, 2021 23 pages.
U.S. Office Action in U.S. Appl. No. 16/247,892 dated Jul. 15, 2021, 25 pages.
U.S. Office Action in U.S. Appl. No. 16/730,417, dated Sep. 23, 2021, 9 pages.

(56) References Cited

OTHER PUBLICATIONS

Office Action in U.S. Appl. No. 16/723,413, dated Jun. 21, 2022, 27 pages.
Notice of Allowance in U.S. Appl. No. 16/247,892, dated Mar. 3, 2022, 6 pages.
Office Action in U.S. Appl. No. 16/783,998, dated Feb. 16, 2022, 35 pages.
Office Action in U.S. Appl. No. 16/804,575, dated Feb. 15, 2022, 12 pages.
Office Action in U.S. Appl. No. 17/316,201, dated Feb. 15, 2022, 25 pages.
Notice of Allowance in U.S. Appl. No. 16/688,065, dated Sep. 30, 2021, 9 pages.
Notice of Allowance in U.S. Appl. No. 17/021,116, dated Jan. 20, 2022, 8 pages.
Notice of Allowance in U.S. Appl. No. 17/316,201, dated Jun. 2, 2022, 8 pages.
Office Action in U.S. Appl. No. 16/804,644, dated Apr. 22, 2021, 37 pages.
Office Action in U.S. Appl. No. 16/804,644, dated Mar. 17, 2022, 47 pages.
Office Action in U.S. Appl. No. 16/804,644, dated Oct. 28, 2021, 45 pages.
Office Action in U.S. Appl. No. 17/021,116, dated Sep. 8, 2021, 24 pages.
Office Action in U.S. Appl. No. 17/065,837, dated Feb. 11, 2022, 12 pages.
Office Action in U.S. Appl. No. 17/084,574, dated Jan. 13, 2022, 30 pages.
Office Action in U.S. Appl. No. 17/155,365, dated Mar. 28, 2022, 14 pages.
Office Action in U.S. Appl. No. 17/172,767, dated Jan. 6, 2022, 9 pages.
Office Action in U.S. Appl. No. 17/179,479, dated Apr. 8, 2022, 9 pages.
Office Action in U.S. Appl. No. 17/180,171, dated Apr. 27, 2022, 32 pages.
Notice of Allowance in U.S. Appl. No. 16/247,892, dated Jul. 7, 2022, 6 pages.
Notice of Allowance in U.S. Appl. No. 17/172,767, dated Jul. 5, 2022, 9 pages.
Office Action in U.S. Appl. No. 16/804,575, dated Jun. 24, 2022, 14 pages.
Notice of Allowance in U.S. Appl. No. 17/065,837, dated Jul. 28, 2022, 10 pages.
Notice of Allowance in U.S. Appl. No. 17/179,479, dated Sep. 27, 2022, 7 pages.
Office Action in U.S. Appl. No. 16/783,998, dated Sep. 20, 2022, 39 pages.
Office Action in U.S. Appl. No. 16/804,575, dated Oct. 6, 2022, 13 pages.
Office Action in U.S. Appl. No. 16/804,644, dated Sep. 16, 2022, 49 pages.
Office Action in U.S. Appl. No. 17/084,574, dated Aug. 19, 2022, 38 pages.
Office Action in U.S. Appl. No. 17/155,365, dated Sep. 27, 2022, 18 pages.
Office Action in U.S. Appl. No. 17/180,171, dated Jul. 29, 2022, 40 pages.
Notice of Allowance in U.S. Appl. No. 16/723,413, dated Mar. 13, 2023, 23 pages.
Notice of Allowance in U.S. Appl. No. 16/783,998, dated Feb. 9, 2023, 16 pages.
Notice of Allowance in U.S. Appl. No. 17/097,489, dated Sep. 20, 2022, 15 pages.
Notice of Allowance in U.S. Appl. No. 17/155,365, dated Feb. 15, 2023, 13 pages.
Office Action in U.S. Appl. No. 16/804,575, dated Feb. 24, 2023, 15 pages.
Office Action in U.S. Appl. No. 17/084,574, dated Feb. 16, 2023, 41 pages.
Office Action in U.S. Appl. No. 17/097,489, dated Apr. 1, 2022, 17 pages.
Office Action in U.S. Appl. No. 17/166,023, dated Jan. 3, 2023, 21 pages.
Office Action in U.S. Appl. No. 17/180,171, dated Dec. 5, 2022, 39 pages.

* cited by examiner

PROVIDING CONTEXTUALLY-RELEVANT DATABASE CONTENT BASED ON CALENDAR DATA

CROSS-REFERENCE TO RELATED APPLICATION

This application claims the benefit of U.S. Provisional Patent Application No. 62/720,955 filed on Aug. 22, 2018, the entire contents of which is incorporated herein by reference.

TECHNICAL FIELD

This specification generally relates to providing contextually-relevant database content.

BACKGROUND

Databases often include information about many topics. Users often retrieve content from issuing a query, for example, using natural language or using a structured query language (SQL).

SUMMARY

In some implementations, a computing device can run software that monitors conditions of the computing device and detects when database content is relevant to the current context of the computing device. In response to detecting an appropriate context, the computing device presents an information card with content from the database or a control allowing the user to access the information card. This technique allows database information to be provided automatically at the specific time that it is relevant to the user, without requiring the user to request or seek out the information. In many cases, this allows database content relevant to a user's current task or activity to be provided, often without requiring the user to leave the current user interface. Thus, as a user creates a message, views a calendar appointment, looks up a contact from a contact book, or performs another activity, database content determined to be related may be made available from the current user interface.

In many conventional systems, a user needs to submit a query, open or switch to a specific application, or otherwise take steps to request database content. By contrast, techniques discussed in this document enable a computing device to dynamically select and provide database information without a user request, based instead on context such as content displayed by the computing device, a location of the computing device, messages to or from the computing device, and so on.

The ability to dynamically provide database content as the context of a computing device changes can be particularly useful for mobile devices. Software on the computing device that runs in the background can cause information cards to be presented on various interfaces of an operating system or third-party applications. For example, the presentation of information cards with database content can be integrated with a messaging application, a calendar application, search functionality, or any other application or interface of the mobile device.

As discussed further below, both the timing for providing database content and the selection of the content provided can be determined using context of the computing device. One aspect of context that is used is the presence of terms referring to entities, such as people, locations, objects, companies, etc., having corresponding records in a database. A computing system can dynamically retrieve and present information corresponding to an entity based on monitoring context-specific trigger conditions on a computing device. The information cards can include database content that is indexed by keywords, such as entity names, metadata for the entity, or topics associated with an entity classification. For example, a computing device can run an application that monitors activity on the computing device to determine if trigger conditions related to keywords have been satisfied. Examples of these triggers include the presence of an entity-related keyword in a user interface, an email or text message, a calendar reminder or record, a search query or search result, speech recognition of a voice query, a video or image collected by a camera, among others.

If a trigger condition is satisfied, the application causes an information card or information panel to be displayed on or spoken through the computing device. This technique allows a user to easily access or obtain information that is contextually relevant to actions performed on the computing device, without requiring the user to manually access the information or provide additional inputs. As discussed below, other techniques disclosed herein also provide other advantages, such as allowing users to receive information that may be difficult to manually retrieve from a database.

In some implementations, the information cards can be displayed on a computing device without requiring a user to request that information be displayed. The computing device can run an application that monitors actions performed on the computing device. The application uses the monitored actions to track the occurrence of keywords that can then be used to display information cards at specified points in time when the user is likely view information included in the information cards. For example, the application can monitor calendar data, including notifications or reminders issued by a separate calendar application, to detect an upcoming calendar appointment. The application determines that the calendar data includes text corresponding to an entity associated with a user information card. In response, the application then causes the information card to be displayed on the computing device. For example, the application can cause the information card to be presented along with a notification from the calendar application, or based on the appointment time (e.g., fifteen minutes before the start time of the calendar appointment so that the user can access relevant entity information during the calendar appointment). The application minimizes the burden imposed on the user, as the user does not need to open a calendar application, or look up an appointment, or even know that database content relevant to the appointment is available. Still, the computing system provides contextually-relevant information for the appointment triggered by monitoring the calendar data and without requiring the user to perform any actions to instruct the mobile device to retrieve the information card.

The keywords monitored by the application can be customized for different actions performed on the mobile device and a user's account. In some instances, the set of keywords that trigger display of database content are specific to a user or the user's organization. For example, when the user is an employee of a company, the keywords of interest can be extracted from a private database for the company. The keywords can additionally or alternatively be selected or filtered to terms applicable to the specific user, e.g., terms relevant to the user's role in the company. When one of the keywords is determined to be present in the user interface, the application communicates with a server system to obtain information related to the keyword. This information can include data retrieved from a private database that has information specific to an organization associated with the user.

In one general aspect, a method is performed by one or more computing devices. The method can include: monitoring, by the one or more computing devices, a first computing device to detect actions of the first computing device that involve calendar data for a user; in response to detecting an action of the first computing device that is associated with a calendar appointment for the user, determining, by the one or more computing devices, that text corresponding to the calendar appointment includes a term associated with a particular entity; in response to determining that the text corresponding to the calendar appointment includes the term associated with the particular entity: obtaining, by the one or more computing devices, data for a user information card including information related to the particular entity; and causing, by the one or more computing devices, the first computing device to display the user information card or an interactive control configured to initiate display of the user information card.

One or more implementations can include the following optional features. For example, in some implementations, the interactive control configured to initiate display of the user information card comprises a notification displayed on the first computing device before the user has logged into the first computing device.

In some implementations, the method can also include: receiving, by the one or more computing devices, an indication that the user has selected the notification and logged into the device; and in response to receiving the indication, causing, by the one or more computing devices, the first computing device to display the user information card.

In some implementations, the method include performing additional operations in response to determining that the text corresponding to the calendar appointment includes the term associated with the particular entity. For example, the method includes: selecting, by the one or more computing devices, a template for the user information card from among a plurality of templates that each specify a different format for the user information card; and generating, by the one or more computing device, the user information card based on the data for the user information card including information related to the identified entity and the template selected for the user information card.

In some implementations, each template included in the plurality of templates specifies a different subset of information fields for the information related to the identified entity.

In some implementations, the first computing device is monitored by an application that runs on the first computing device. Additionally, actions of the first computing device that involve calendar data for a user are detected by the application and the application determines that text corresponding to the calendar appointment includes the term associated with a particular entity.

In some implementations, causing the first computing device to display the user information card includes causing the first computing device to launch the application to display the user information card in a user interface of the application.

In another general aspect, a method is performed by one or more computing devices. The method can include: accessing message data for one or more messages in a message thread shown on a messaging user interface of a client device; determining, based on the message data, that at least one message in the message thread includes a term corresponding to a particular entity; in response to determining that the at least one message in the message thread includes the term corresponding to the particular entity: obtaining data for an information card for the particular entity; and providing, in connection with the messaging user interface, a control configured to insert, in a message for the message thread, an information card describing the particular entity, the information card including (i) an image of the information card accessible to all recipients, and (ii) data configured to cause a receiving device, configured with one of a predetermined set of user credentials, to identify and display additional information about the particular entity.

One or more implementations can include the following optional features. For example, in some implementations, the method can also include: receiving data indicating interaction with the control on the client device; and in response to receiving the data indicating interaction with the control on the client device, providing, to a receiving device that communicates with the client device, a second control that causes the receiving device to request an information card for the particular entity from a server.

In some implementations, identifying the additional information about the particular entity includes: identifying a set of user credentials for a user of the receiving device; and determining, from among a set of information about the particular entity, a subset of information is permitted for access by the user of the receiving device based on the identified set of user credentials for the user of the receiving device.

In some implementations, the client device is configured with a first set of user credentials of the predetermined set of user credentials. Additionally, the method further includes determining that the first set of user credentials does not provide access to the additional information about the particular entity.

In some implementations, the receiving device is configured with a second set of user credentials of the predetermined set of user credentials. Additionally, the method further includes: determining that the second set of user credentials provides access to the additional information about the particular entity; in response to determining that the second set of user credentials provides access to the additional information about the particular entity; and causing the receiving device to display the additional information about the particular entity in response to receiving an input selecting an image of the information card shown on a messaging user interface of the receiving device.

The details of one or more Implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
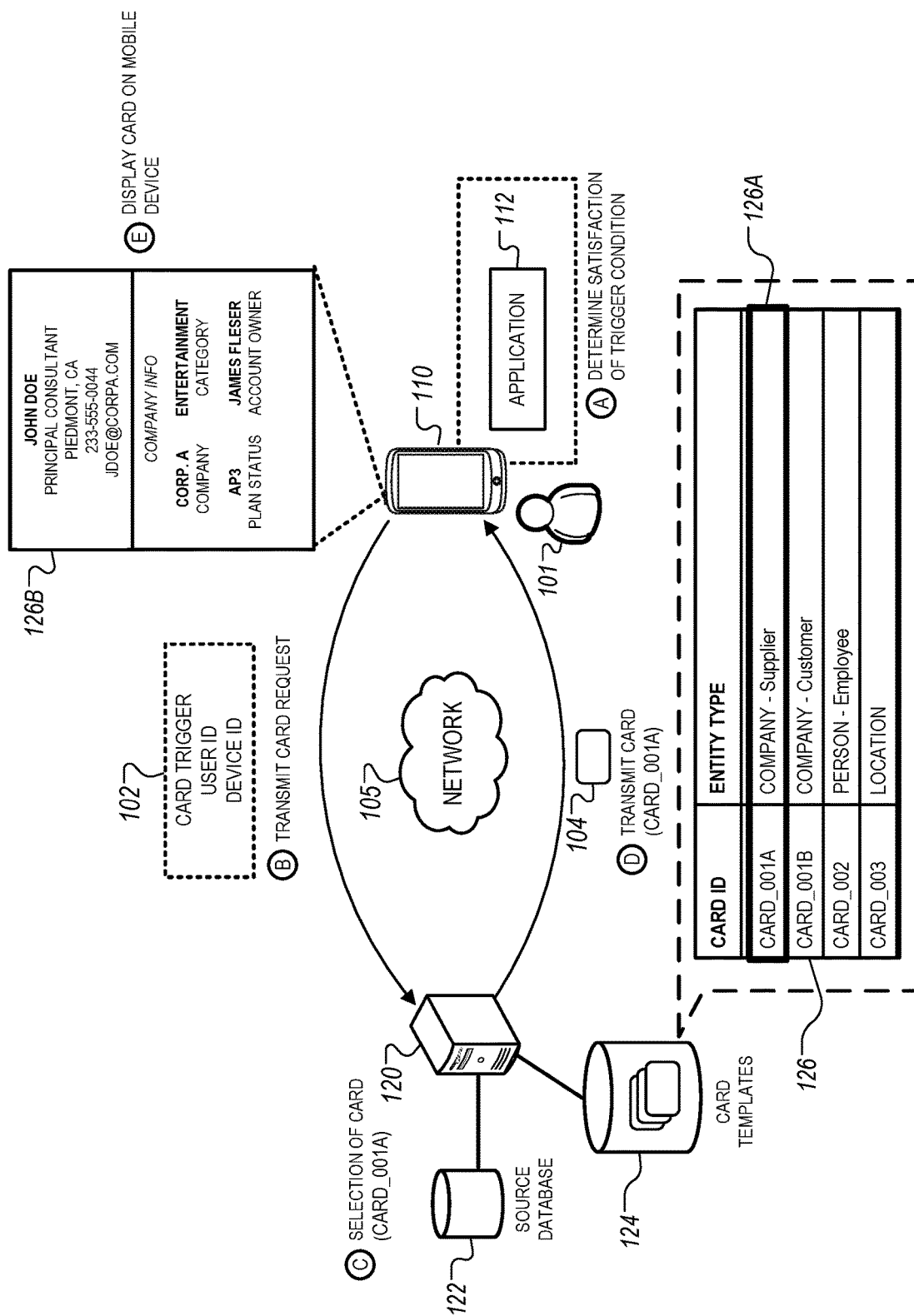
FIG. 1 illustrates an example of a system that is capable of dynamically generating and displaying information cards based on the context of a computing device.

FIG. 1 illustrates an example of a system 100 that is capable of dynamically generating and displaying information cards. The system 100 includes a client device 110, a server 120, and a network 105. The server 120 has access to a source database 122 for an organization. The server 120 can be implemented using multiple computers that cooperate to perform the functions discussed below, and which may be located remotely from each other.

The client device 110 includes an application 112 that enables the client device 110 to dynamically generate and display contextually-relevant information cards in response to certain actions being performed on the client device 110 or certain conditions of the client device 110 being detected. As discussed below, the application 112 allows the client device 110 to obtain and provide information from the source database 122 through information cards that can be dynamically adjusted based on the actions or conditions detected on the client device 110. In some implementations, the application 112 runs in the background, out of view of the user, and monitors conditions of the client device 110 on an ongoing basis. The application 112 may interact with an operating system of the client device 110, for example, using one or more application programming interfaces (APIs), to obtain various types of content, such as image data and/or text displayed on screen, image data or text of user interfaces of applications (which may or may not be currently displayed on screen), device notifications, messages (e.g., e-mails or SMS text messages), calendar data, received radiofrequency beacon messages, and so on.

The client device 110 is associated with a user 101. When the application 112 is installed, a user identifier for the user 101 can be determined. For example, on installation or afterward, the user 101 may log in using one or more credentials. The application 112 may then customize various aspects of the system for the user 101, including the trigger conditions used to detect an appropriate context for providing an information card as well as the type of content included in information cards.

In the example, the user 101 is a member of an organization, e.g., an employee of a company. The source database 122 represents database records stored by or for the organization. The records are not publicly available and are subject to data access restrictions, such as requirements that users be issued credentials from the organization that grant authorization to access the records. Different users may be granted different levels of authorization, and the server 120 enforces access restrictions so that each user is only allowed to access the subsets of information the user is authorized to access.

The system 100 improves techniques used to provide users with access to information in a more convenient and contextually relevant fashion. Information is presented through information cards that are displayed at specified points in time based on the satisfaction of context-based trigger conditions representing the relevance of specific topics or keywords to the activities of the client device 110. In this manner, the system 100 improves the relevance of information that is displayed to a user based on actions performed on the client device 110 and ensures that the displayed information is likely to represent information that is of interest to the user, at the time information is of interest to the user. Unlike many other systems, the user 101 does not need to manually submit a query or select from a list to obtain the information. Instead, the application 112 initiates display of the information as it detects that the information corresponds to the current context of the client device 110.

In FIG. 1, information cards are presented on the client device 110 as cards that include information obtained from the source database 122. The cards can include dynamically generated information so that they reflect changes to data stored in the source database 122. For example, the server 120 can store card templates 124 that identify, for example, the format and structure of the cards. The specific information that is displayed in the cards can be dynamically populated into the templates at the time the cards are determined to be relevant, so that each display of a card includes information generated from up-to-date information from the source database 122. Thus, if the same card for the same entity is displayed at different times, the content may be different for each instance of the card as the information in the source database 122 changes.

The card templates 124 can include different templates for different types of entities. For example, one template may be used for a person, another template may be used for a company, another template may be used for a location (e.g., a particular store or region), and so on. Different card templates 124 may also be defined and used for entities having different semantic relationships with the user 101, the user's organization, or others. For example, a first template may be used for companies that are customers, and may specify a first set of statistical measures to display in a card. A second template for suppliers may specify a different set of statistical measures to display in a card.

Briefly, in the example of FIG. 1, the application 112 on the client device 110 detects a context-based condition, such as a keyword representing an entity having corresponding information in the database 122. The application 112 causes the client device 110 to request an information card, and the server 120 selects an appropriate information card, generates the information card, and sends data for the card back to the client device 110 for display. The example is explained in further detail below with respect to various stages labelled (A) through (E).

In stage (A), the application 112 monitors activity on the client device 110 to detect satisfaction of a trigger condition that specifies display of an information card on the client device 110. Trigger conditions can represent activity on the client device 110 indicating that the user 101 is likely to view or hear information.

The trigger conditions can be monitored passively without requiring the user 101 to provide input on the client device 110. For example, detection of an entity term in the text corresponding to an upcoming calendar appointment through a calendar application of the client device 110 can represent satisfaction of a trigger condition indicating that a user is likely to view information associated with the entity. In this example, the client device 110 monitors calendar data of the calendar application without the user 101 actively requesting the information, which reduces the number of user inputs required to display contextually-relevant information (i.e., information for an entity that is a participant to the calendar appointment).

In another example, the trigger condition can represent a location of the client device 110 being detected to be within threshold proximity (e.g., within 100 meters) of a conference center that is associated with information cards. In this example, the application 112 determines that the user 101 is likely to view conference information based on the location of the client device 110 and thereby determines that a trigger condition has been satisfied.

In some instances, the trigger conditions can represent action performed by the user on the client device 110 that relates to a particular entity or topic. For example, detection of message that includes a term corresponding to an entity can represent satisfaction of a trigger condition related to displaying information of the entity. In some other examples, the trigger condition can represent a search query received for an entity term, or some action performed on the client device 110 that indicates that the user 101 is requesting information, e.g., performing a web search through a browser application, performing a search using capabilities of the operating system (e.g., for an application, a file, etc.), among others.

In stage (B), the client device 110 transmits a card request 102 to the server 120. The card request 102 can indicates the term(s) identified as corresponding to an entity, or an indication of the entity determined to be relevant to the current context. Accordingly, the card request 102 may include monitored data collected at the client device 110, such as data indicating the trigger condition that was determined to be satisfied by the application 112. The card request 102 can also include an identifier for the user 101 and/or the client device 110. The identifiers can be used to customize the information that is displayed on the client device 110. For example, the organization managing the source database 122 can specify different levels of access to the source database 122 based on a user classification specified by a user or device identifier. In this manner, the system 100 can generate and display different information cards for users in response to satisfaction of the same trigger condition.

In stage (C), upon receiving the card request 102, the server 120 accesses the source database 122 and generates one or more information cards that are provided to the client device 110 in response to the card request 102. The server 120 generates information cards that are relevant to entity terms corresponding to the trigger condition detected in stage (A). For example, the server 120 can generate cards that include information for an entity that the client device 110 identified in text in a user interface of the client device 110, such as a calendar appointment, a text message, a search interface, etc., even though the text is found in a user interface of the operating system or an application different from the application 112. In some situations, the reference to the entity has been detected by the client device 110 in data that is not part of a user interface, such as the content of a notification, message, or record accessed by the client device 110. In this example, the selected information cards can include information corresponding to the entity in the source database 122.

The server 120 can also perform various text processing techniques in selecting cards to provide for output to the client device 110. For example, the server 120 identify terms included in a text message received by the client device 110 and determine if the text message includes keywords that are associated with information stored in the source database 122, or are associated with a card template from among the card templates 124. The server 120 can compare terms in the text message with keywords associated with the source database 122 to identify matching terms. When server 120 identifies one or more matches, it populates a card template with information that is indexed in the source database 122 as corresponding to the matched terms. In some scenarios where keywords match multiple possible card templates, e.g., information cards for two employees with the same name, the server 120 can either display all relevant cards, or alternatively, request the user to provide additional information to determine the correct entity associated with the keywords.

In addition to selecting the information from the source database 122, the server 120 also selects a card template from among the card templates 124. The server 120 uses the selected information and selected template to generate information cards that are presented on the client device 110. The server 120 accesses a table 126 to determine the information from the source database 122 to include in a card template from the card templates 124. The table 126 includes a card identifier that specifies a card template included in the card templates 124, and for each card identifier, one or more associated entity terms and term classifications. As shown in FIG. 1, the table 126 identifies different types of entity terms, e.g., "COMPANY," "PERSON," "LOCATION" for which different cards can be generated. The table 126 can also multiply card templates for entities of the same entity type. For example, the table 126 specifies a template "CARD_001A" for a supplier and a template "CARD_001b" for a customer although both the supplier and customers are classified as companies.

In some implementations, server 120 may examine contextual factors associated with the client device 110 that may be of interest to identify a card template that may be the most appropriate to selected information selected from the source database 122. For example, if calendar data indicates that the user 101 is presently in a meeting, then the server 120 can select a card template that provides less information than in a scenario where, for example, the calendar data indicates that the user 101 is not actively in a meeting (and has more bandwidth to interact with the information card). As another example, the server 120 can provide an information card that is a notification in scenarios where a user's participation is expected to be limited, and an interactive information card that allows the user to manipulate information displayed in the information card when the user's attention is more likely to be focused on the display of the client device 110. In some instances, the type of trigger condition that is detected at the client device 110 can be the contextual factor that the server 120 uses to select the appropriate card template.

In stage (D), the server 120 transmits an information card 104 for presentation on the client device 110. In stage (E), upon receiving the information card 104 from the server 120, the client device 110 presents the information card 104 for display on a user interface 126B. The information card 104 can be presented in or with the current user interface of the client device 110, which may be outside the application 112. For example, the information card 104 may be provided through the operating system (OS) functionality of the client device 110 outside of the application 112, e.g., as an OS notification. In general, the information card 104 may be displayed in, alongside, or on (e.g., as an overlay to) the application or interface that has the term(s) that triggered the presentation of the information card 104, such as the current interface of the client device 110, whether the current application or interface is one for messaging, search, calendar management, and so on, or even a lock screen or home screen showing general system notifications. In some instances, the information card 104 can be presented through the application 112, e.g., as an application message, or a data object presented on a user interface of the application 112. The information card 104 can also be displayed in different formats, such as an image, an interactive control configured to initiate display of the information, e.g., a button that displays the information in response to receiving a user input.

In the example depicted in FIG. 1, the application 112 detects an upcoming calendar event for an upcoming meeting with an employee of the entity "Corporation A." The application 112 determines that a calendar event trigger condition has been satisfied based on processing calendar data of the client device 110 and determining that text corresponding to the calendar event references the entity. The server 120 receives the card request 102 from the client device 110 and selects card template "CARD_001A" identified in row 126A of the table 126 and specifies the generation of an information card 104 for a supplier "JOHN DOE" identified in the calendar appointment. The server 120 obtains information associated with "JOHN DOE" from the source database 122.

As shown in FIG. 1, the information card 104 displayed on the user interface 126B includes information for "JOHN DOE," an employee of supplier company. The server 120 selects information for this employee from the source database 122 since the calendar appointment detected by the application 112 identifies "JOHN DOE" in the text of the calendar appointment. In this example, the system 100 therefore passively processes calendar data to determine that the user 101 has an upcoming meeting with "JOHN DOE" and would benefit from receiving employee information prior to or during the meeting.

In some implementations, the system 100 can be configured to deliver information cards to the client device 110 based on processing activity or usage data collected on the client device 110 and determine times when an information card is to be relevant to actions being performed on the client device 110, such as the user writing an email, the user viewing a calendar appointment, or other scenarios where the user accesses data corresponding to entity-specific information. For example, the server 120 can collect usage data collected by the operating system of the client device 110 that indicates application usage times, time periods of frequent device usage, types of applications or webpages being accessed by the user, among other types of usage metrics. The server 120 can use pattern recognition techniques to process the usage data to predict points in time when certain information cards are likely to correspond to terms that are being accessed during actions being performed on the client device 110. As an example, if the usage data indicates that the user frequently reads articles between 7 AM and 8 AM every morning that reference certain business entities, then the server 120 can provide information cards that include information on stocks for the business entities to the user during that time frame. The server 120 can also adjust the content included in the information cards over time so that only information for entities that are often referenced in the articles read by the user are included in the information cards that are provided to the client device 110.

Additionally, the application 112 can configure the client device 110 to display data representing the information cards in a non-obtrusive manner. For example, the application 112 can provide an operating system notification on the client device 110 once the client device 110 has received an information card from the server 120 instead of redirecting the client device 110 to the information card and potentially disrupting the present activity being performed by the user. In some instances, information cards that are received by the client device 110 over a certain time period can be accumulated by the application 112. A reminder can then be sent to the client device 110 at a specified point in time that allows the user to access all accumulated information cards. For example, a reminder can be displayed on the client device 110 every morning, when then allows the user to view information cards received on the preceding day.

In some implementations, the system is capable of outputting information cards or data associated with information cards while a user accesses various applications running on the client device 110. In such implementations, the application 112 can run as a background process and monitor user activity on other applications to detect the satisfaction of trigger conditions. For example, if a user highlights or selects text that is displayed through a web browser application on the client device 110, the application 112 can detect that a trigger condition has been satisfied and the highlighted or selected text can be used as entity terms to identify and output information cards corresponding to the highlighted or selected text. In some instances, the user can be provided with a notification that indicates that relevant information cards are available for the highlighted or selected text, and upon selection, the user can be directed to the application 112 to access the information cards.

Figure 2:
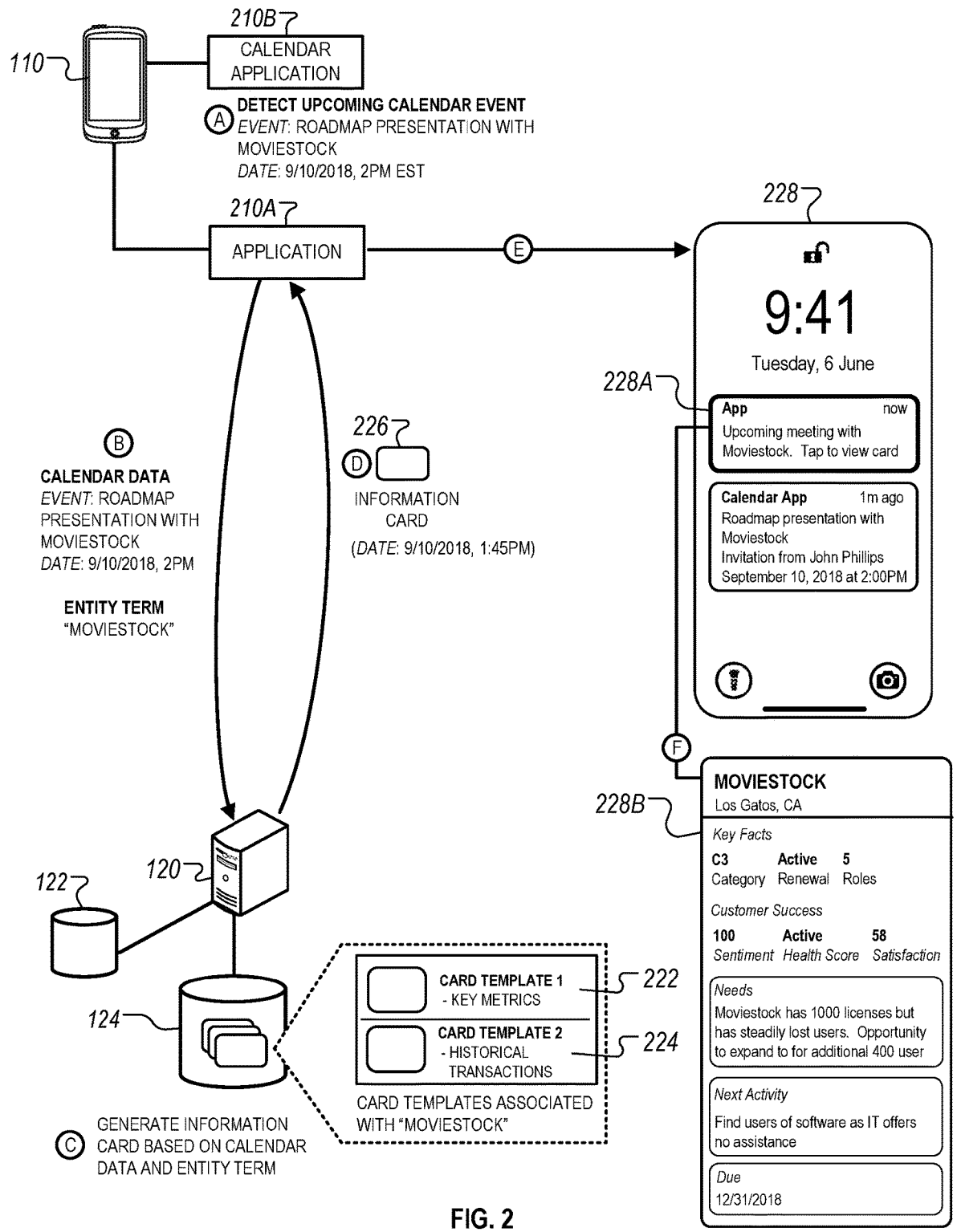
FIG. 2 illustrates an example of a technique for displaying information cards based on monitoring calendar data.

FIG. 2 illustrates an example of a technique for displaying information cards based on monitoring calendar data. In this example, an application 210A running on the client device 110 passively monitors a calendar application 2108 of the client device 110 to detect actions that involve calendar data. The application 210A instructs the client device 110 to display information cards if text corresponding to calendar data include terms corresponding to an entity for which information is stored in the source database 122.

In stage (A), the application 210A monitors calendar data of the calendar application 210B to detect an upcoming calendar appointment. The calendar appointment is detected without requiring any user input on the client device 110 since the application 210A runs as a background process that periodically monitors calendar data. The application 210A may parse text data included in a calendar appointment (e.g., text fields representing organizer, time, location, and title) to determine if the parsed text data includes an entity term. In FIG. 2, the application 210A determines that the event description of the calendar appointment includes the entity term "MOVESTOCK," which is a company for which corporate information is stored in the source database 122.

In stage (B), the application 210A provides calendar data associated with the detected calendar appointment and the entity term to the server 120. The calendar data includes text that the application 210A determines includes the entity term.

In stage (C), the server 120 generates an information card to be displayed on the client device 110. The server 120 retrieves information stored in the source database 122 corresponding to the entity term. The server 120 also selects a card template from among the set of pre-defined card templates 124 for generating the information card. As discussed above, the set of card templates 124 can include different types of cards, e.g., cards displaying different types of entity information, or cards with different formats, e.g., cards with different combinations of information fields for the same entity information. The server 120 can select the card template to be used to generate the information based on different factors, such as the type of event represented by the calendar data, context data collected on the client device 110 in association with the calendar appointment, or a time of day associated with the calendar event.

In FIG. 2, the server 120 selects card template 222, which includes key transaction metrics for the entity "MOVIESTOCK," for generating the information card. This selection is based on the event title of the calendar appointment indicating that the meeting is a roadmap presentation. The server 120 determines that the key metrics displayed in card template 222 are more likely to be of interest to a user of the client device 110 during the calendar appointment compared to the historical transactions included in the calendar template 224.

The server 120 dynamically accesses information stored in the source database 122 so that the information displayed on the information card 226 represents up-to-date data metrics at the time of card generation. To accomplish this, the server 120 can identify information fields that are included in the selected card template 222, identify corresponding values for the information fields in the source database 122, and insert the identified values in the information values. In this manner, the server 120 reduces the likelihood that the card includes obsolete or outdated information when presented on the client device 110. The technique depicted in FIG. 2 can therefore be used to more accurately display entity information that is frequently adjusted over time. In stage (D), the server 120 provides the information card 226 to the application 210A.

In stage (E), upon receiving the information card 226, the application 210A causes the client device 110 to display a notification 228A on a user interface 228 of the client device 110. In FIG. 2, the user interface 228 represents a lock screen where system notifications are displayed to a user before he/she logs into the client device 110. The notification 228A can be handled by the operating system of the client device 110 and configured to prevent sensitive information of the card 226 to be displayed on the user interface 228. For example, notification 228A can identify that a card is available for access on the client device 110 without actually displaying the information that is included in the card. A user can interact with the notification 228A to access the sensitive information that is actually included in the information card 226.

Additionally, the application 210A causes the client device 110 to present the notification 228A independently of other system notifications, such as a notification for the calendar application identifying the upcoming calendar appointment. This features allows the user to view the information card as a supplement to calendar notifications for a calendar event.

In stage (F), the client device 110 presents a display 228B of the information card 226 on once a user interacts with the notification 228A, e.g., by providing an input selecting it. The display 228B can be presented through an interface of the application 210A. For example, once the user interacts with the notification 228A, the client device 110 can be configured to execute the application 210A and present the display 228B through the application. Alternatively, the client device 110 can present the display 228B as a pop-up window that runs in the operating system of the client device 110 and without launching the application 210A.

In some implementations, the display 228B can be passively presented on the client device 110 at a designated point in time without requiring the user to provide an input selecting the notification 228A. For example, if the user is logged into the client device 110 and actively using the client device 110, the client device 110 can be configured to present the display 228B either five minutes before, or at the start time of, the calendar appointment. In this way, the display 228B can be presented without requiring the user to perform any additional actions on the client device 110, which allows the user with access to relevant information, e.g., key facts and metrics for an entity, without requiring the user to search for the information or perform actions to display the information.

Figure 3:
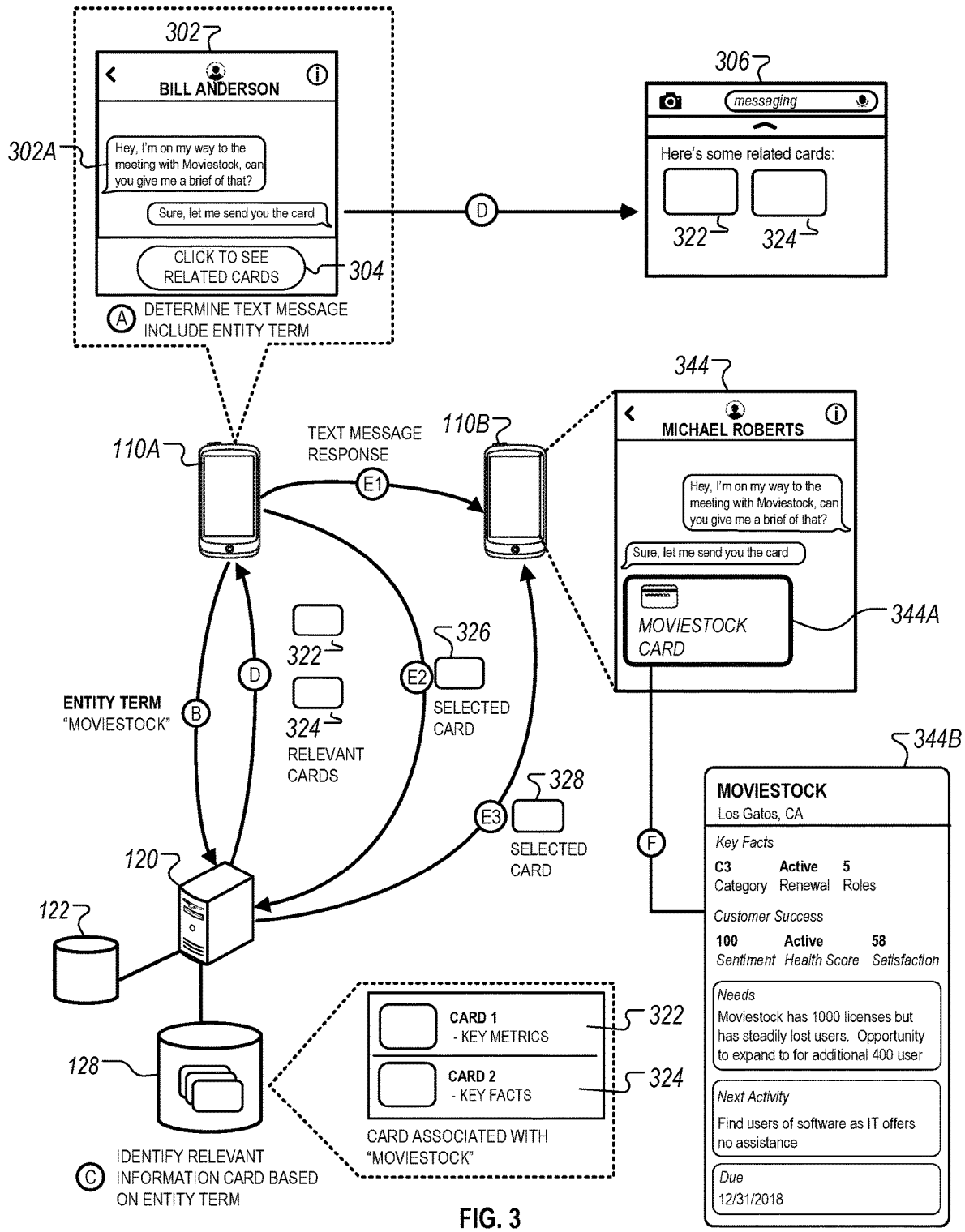
FIG. 3 illustrates an example of a technique for displaying information cards based on monitoring messaging data.

FIG. 3 illustrates an example of a technique for displaying information cards based on monitoring messaging data. In this example, an information card can be exchanged between two client devices 110A and 110B during a text conversation. The server 120 manages presentation of the information card based on monitoring text messages of the text conversion and privileges associated with the users.

In stage (A), the client device 110A monitors message data and determines that a message 302A in a message thread shown on a messaging user interface 302 includes a term corresponding to an entity. In FIG. 3, the message 302A includes the term "MOVIESTOCK." The client device 110 determines that this term represents a company for which information is stored in the source database 122 and is associated with information cards stored in the card database 128. In stage (B), the client device 110A notifies the server 120 that the entity term was detected in the message 302A.

In stage (C), the server 120 identifies information cards in a card database 128 that are relevant to the entity term that was detected in the message 302A. The card database 128 can include pre-generated information cards that include information that is stored in the source database 122. The server 120 can identify the relevant information cards by using the entity term as a search index to identify information cards that, for example, include the entity term itself or include information corresponding to the entity. In FIG. 3, the server 120 identifies two relevant information cards 322 and 324 that are each associated with the entity "MOVIESTOCK" and include different types of information for the entity. Information card 322 includes information relating key metrics of the entity while information card 324 includes information relating to key facts of the entity. In stage (D), the server 120 provides the information cards 322 and 324 to the client device 110 to display in a list of options for selection by the user.

In stage (D), upon receiving data indicating the information cards 322 and 324, the client device 110 provides a button 304 on the messaging user interface 302. The button 304 can be selected by a user to view information cards that the server 120 determines are likely to be relevant to the entity term included in message 302A.

After the user selects the button 304, the client device 110 presents an interface 306 that allows the user to select an information card from among a list of relevant information cards. In FIG. 3, the interface 306 is displayed in the messaging application that includes the messaging user interface 302. The interface 306 includes interface elements for information cards 322 and 324 that can be selected by the user.

In stage (E1), once the user selects one or more information cards provided on the interface 306, the client device 110A transmits a text message to the client device 1106. The text message includes a reference to the selected information cards, such as a thumbnail previewing the information card, a deep link for accessing the selected information card, or other types of data structures that do not include the information card itself. The user of the client device 1106 is required to log into, for example, an application prior to accessing the information that is included in the information card. This can be used to ensure that the user that is provided with a text message actually has sufficient privileges to access the information.

In stage (E2), the client device 110 sends the selected information cards to the server 120, which, in stage (E3), provides the selected information cards to the client device 1106. In FIG. 3, the user selects information card 322 and the client device 110 transmits data 326 indicated the selected card to the server 120. The server 120 then transmits an information card 328 corresponding to the selected information card 322 to the client device 1106. As discussed below, in some instances, the selected information cards 322 and 328 can represent different information cards that includes different subsets of information based on the access privileges of the sending and recipient users. By managing the transmission of the information cards to each client device, the server 120 ensures that a user is not provided with an information card that he/she is not authorized to access through a message conversation with another user.

In stage (F), the client device 110B displays a messaging user interface 344 that includes messaging conversation with the user of client device 110A. The messaging user interface 344 includes a message 344A that is received from the client device 110A during the messaging conversation. As discussed above, the message 344A does not actually display or include information specified by the information card 322. Instead, the message 344A can be an interactive element allows the user to access the information card 328 received from the server 120 after the user of the client device 110B has been authenticated with the server 120. For example, the message 344A can include data, e.g., metadata, parameters, executable code, that can be interpreted by an application running on the receiving device 110B to a perform a request and display for additional information, or an enhanced information card that includes more information that the information card 236. In some instances, once the user selects the message 344A, the selection causes the client device 110B to launch the application. The application can require the user to log in with credentials provided by an organization that manages the source database 122 and configures access to the card database 128. Once the user has logged in, the application can display the information card 328 received from server 120 on the interface 344B. The user can then access the information included in the information card 328 through the interface 344B.

In some implementations, the technique depicted in FIG. 3 can be used to provide users of different classifications with different levels of access to information about an entity. The server 120, in such implementations, generates different versions of information cards provide different levels of access to the information about an entity. For example, publicly available information about an entity can be included in each of the version of the information cards, whereas sensitive information about the entity (e.g., confidential financial information, trade secret information, competitive business information) can be included in only some versions of the information cards. The server 120 determines the version of an information card to provide a client device based on a set of access privileges assigned to a user of the client device. For example, a managing director of an organization can be granted a set of access privileges that provides greater access to entity information compared to the set of access privileges granted to an entry-level analyst. The server 120 uses the different sets of access privileges to determine that a client device assigned to the managing director can receive all information cards (including those that include sensitive information) whereas the device assigned to the analyst can only receive information cards that do not include sensitive information.

In the context of a messaging conversation shown in FIG. 3, the server 120 can use different sets of access privileges to provide different versions of information cards to the client devices 110A and 1108 even though they exchange messages over a single messaging thread. For example, when a user selects the message 344A, the server 120 determines the access privileges of the user to determine the version of the information card that the user has access to. In some instances, if the user of the client device 1108 (recipient device) has a greater set of access privileges than the user of the client device 110A (transmitting device), then the information card displayed on the interface 344B can include additional information about the entity that is not accessible by the client device 110A. In this regard, the messaging interface shown in FIG. 3, allows different participants of a messaging thread to receive customized levels of access to entity information based on a set of access privileges that are assigned to them.

In another example, a first user that selects and provides an information card on the client device 110A can have higher set of access privileges compared to a second user that receives the information card on the client device 1108. The server 120, in this example, can adjust the information card that is selected by the first user on the client device 110 such that any sensitive information that the second user is not privileged to access is removed from the information card 328, which is provided to the client device 1108. Thus, the information presented on the interface 344B only includes information that is customized for the access privileges of the second user and does not include information that the first user has access to even though the first user is the user that provides the message 344A to the second user. In this way, the system ensures that information exchanged by users of different classifications does not result in sensitive information being compromised.

In some implementations, information cards can be shared between users that have sufficient access privileges to view or access the shared information cards. For example, after a user has accessed an information card on his/her device, the user can share the accessed the information card with another user through any suitable communication means, such as through the application 210A, email, a Bluetooth device pairing connection, a text message, a proximity-based connection, among others. As discussed above, once the recipient has received the information card, the system determines whether the recipient has sufficient access privileges to access the shared information card before providing access to the shared information card.

Figure 4:
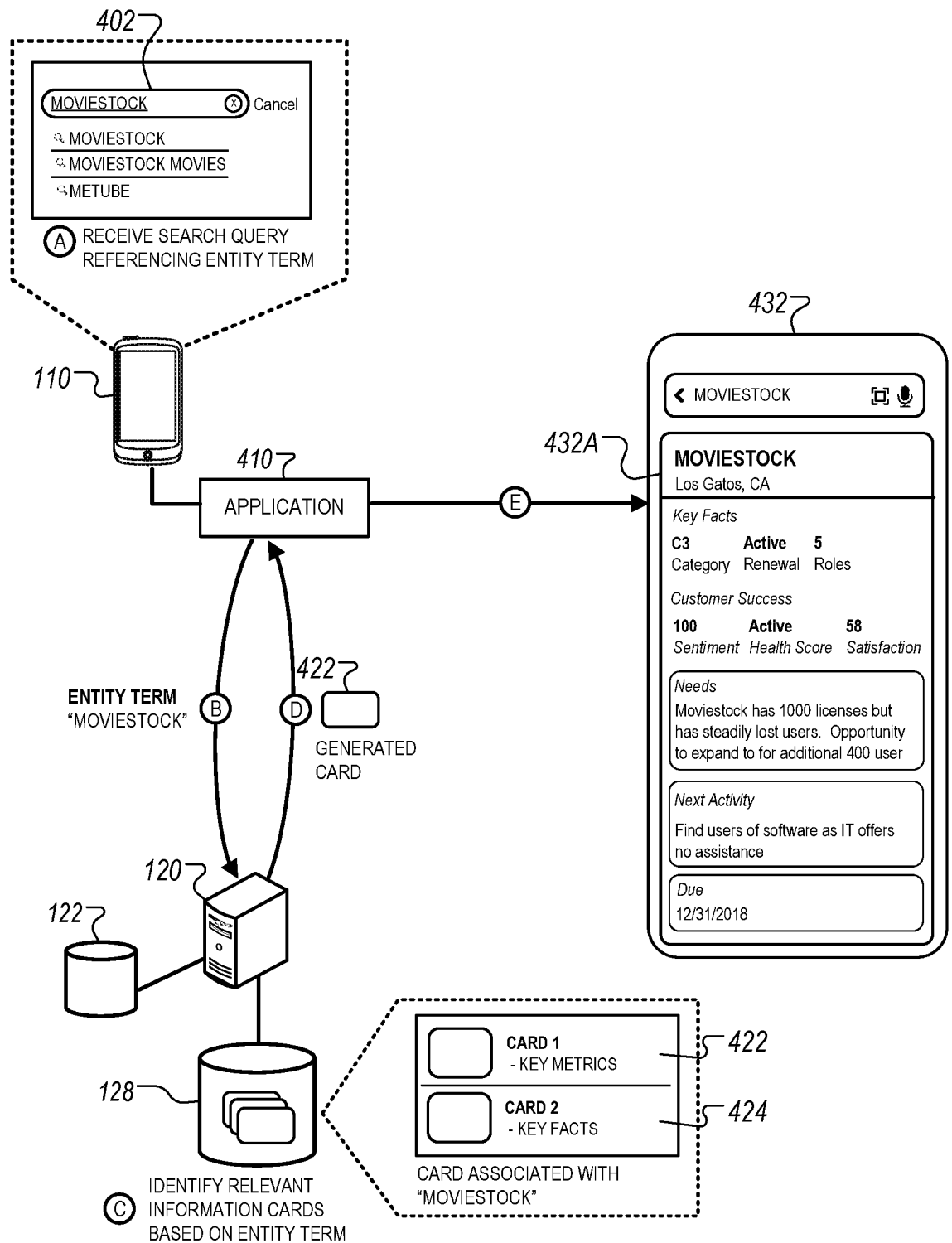
FIG. 4 illustrates an example of a technique for displaying information cards based on monitoring search data.

FIG. 4 illustrates an example of a technique for displaying information cards based on monitoring search query data. In this example, an information card is displayed on the client device 110 in response to receiving a search query from a user.

In stage (A), the client device 110 receives a search query from a user. The search query can be a text query that is provided, for example, using a built-in search engine provided through the operating system of the client device 110, a search engine provided through application 410, or a network-based search engine used to perform a web search. In some instances, the search query can be a voice query that is provided, for example, through a personal assistance service associated with the client device, or an automated speech recognizer provided through the application 112.

In FIG. 4, the user submits a search query 402 in a search field of a built-in search engine provided through the operating system of the client device 110. The search engine enables a user to perform a system-wide search and provides results responsive to the search query, including results for operating system components or results for application data for applications installed on the client device 110, such as the application 410. The application 410 detects the search query 402 and determines that the search query 402 includes a term corresponding to an entity "MOVIESTOCK" using similar text processing techniques discussed above. In stage (B), the application 410 notifies the server 120 that an entity term was detected in the search query 402.

In some implementations, the application 410 can identify the presence of entity terms in either the search query provided by the user or search results that are generated by a search engine in response to the received search query. For example, in FIG. 4, the application 410 can process the text of the search query 402 as well as text of the results "MOVIESTOCK," "MOVIESTOCK MOVIES," and "METUBE" that are generated by the search engine as being responsive to the search query 402. The application 410, in this example, determines that the result "METUBE" also represents a term corresponding to another entity. In stage (B), the application 410 therefore notifies the server 120 to identify information cards for both entities "MOVIETUBE" and "METUBE."

In stage (C), the server 120 identifies information cards in the card database 128 that are relevant to the entity term that was detected in the message 302A. The card database 128 can include pre-generated information cards that include information that is stored in the source database 122. The server 120 can identify the relevant information cards by using the entity term as a search index to identify information cards that, for example, include the entity term itself or include information corresponding to the entity.

In some implementations, the server 120 can provide card data to the client device 110 prior to the selection of relevant information cards or card templates for display on the client device 110 in response to a trigger. In such implementations, the card data is downloaded locally onto the client device 110 so that the identification of relevant information cards using entity terms can be performed without requiring a connection to the server 120. For example, the client device 110 can access downloaded card data offline (i.e., without a network connection) to identify relevant information cards for output on the client device 110.

In FIG. 4, the server 120 identifies two relevant information cards 422 and 424 that are each associated with the entity "MOVIESTOCK" and include different types of information for the entity. Information card 422 includes information relating key metrics of the entity while information card 424 includes information relating to key facts of the entity. In stage (D), the server 120 selects information card 422 and provides it the client device 110. The information card 422 can be outputted in a searching context (e.g., on a search page where a user provides a search query). Upon receiving a user input associated with the information card 422, the user can be directed to the application 112.

In stage (E), the application 410 causes the client device 110 to display the information card 422 on user interface 432. In FIG. 4, the information card 422 is presented as a display 432A on the user interface 432 as a search result that is determined to be responsive to the search query 402 received in stage (A). The user interface 432 can be an interface that is presented through the operating system of the client device, e.g., a search page that allows the user to access a built-in operating system search engine, or an interface that is presented through the application 410, e.g., as a search interface that allows the user to access an application-specific search engine that allow searches relevant application data.

Figure 5:
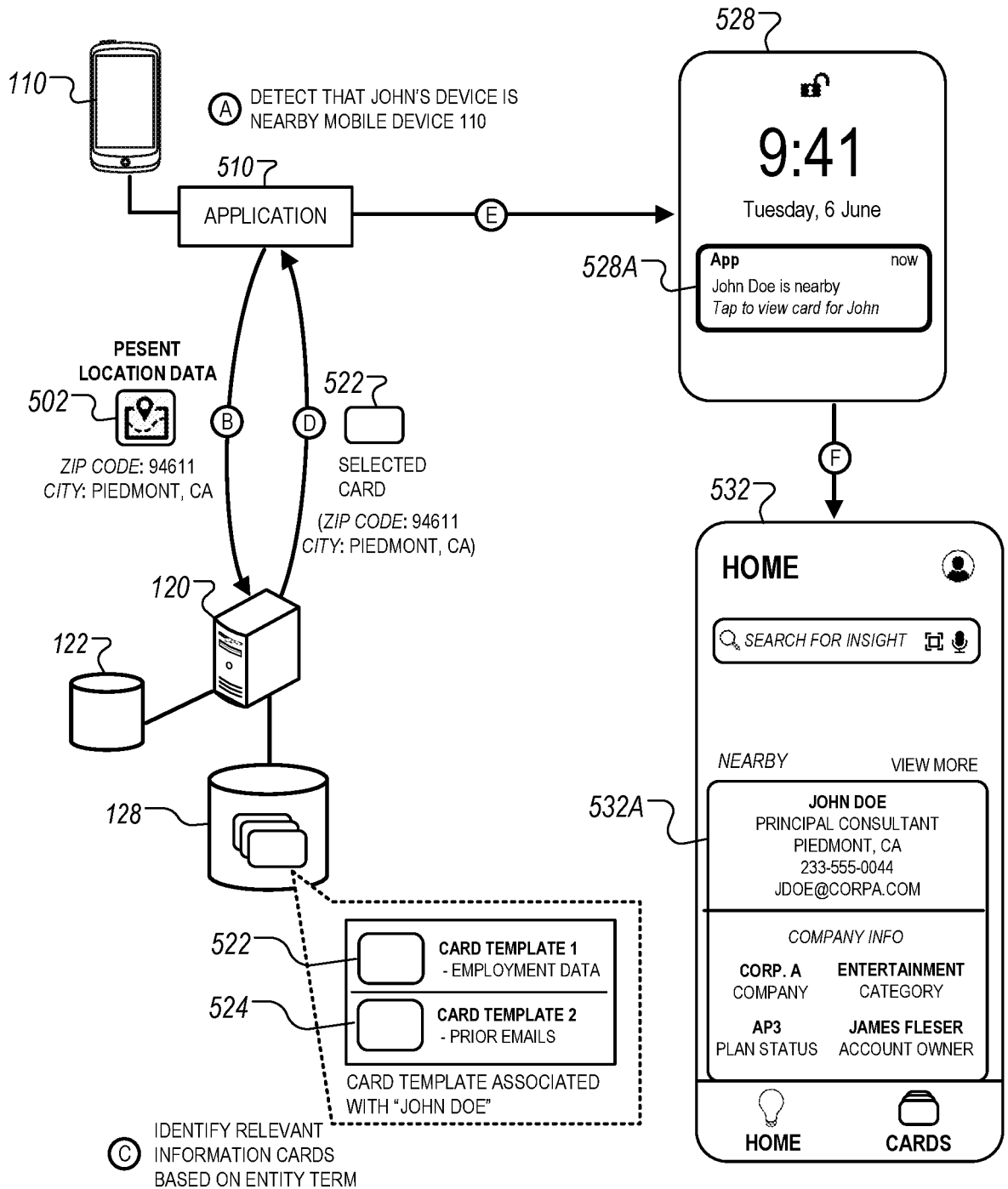
FIG. 5 illustrates an example of a technique for displaying information cards based on monitoring location data.

FIG. 5 illustrates an example of a technique for displaying information cards based on monitoring location data. In this example, an information card is presented on the client device 110 once the client device 110 is detected at a location nearby a point of interest associated with the information card.

In stage (A), an application 510 monitors location data 502 of the client device 110 and determines the client device 110 is presently located nearby a point of interest associated with information cards. In FIG. 5, the application 510 determines that the client device 110 is located nearby a known device of an entity "John." The application 510 determines that John's device is associated with information cards that are stored in the card database 128. In stage (B), the application 510 provides the location data 502 server 120 that the.

In stage (C), the server 120 identifies information cards in the card database 128 that are relevant to the entity of the device detected nearby the present location of the client device 110. The server 120 can identify the relevant information cards by using the entity term as a search index to identify information cards that, for example, include the entity term itself or include information corresponding to the entity. In FIG. 5, the server 120 identifies two relevant information cards 522 and 524 that are each associated with the entity "JOHN" and include different types of information for the entity. Information card 522 includes information relating to John's employment data while information card 524 includes information relating to prior emails John sent to the user. In stage (D), the server 120 selects information card 522 and provides it the client device 110.

In stage (E), the application 510 causes the client device 110 to display a notification 528A on user interface 528 of the client device 110. In FIG. 5, the user interface 528 represents a lock screen where system notifications are displayed to a user before he/she logs into the client device 110. The notification 528A can be handled by the operating system of the client device 110 and configured to prevent sensitive information of the information card 522 to be displayed on the user interface 528. For example, notification 528A can identify that a card is available for access on the client device 110 and that John is nearby the location of the client device 110 without actually displaying John's employment data that is included in the card. A user can interact with the notification 528A and log into the client device 110 to access the sensitive information that is actually included in the information card 522.

In stage (F), the client device 110 presents a display 532A of the information card 522 on once a user interacts with the notification 528A, e.g., by providing an input selecting it. The display 532A can be presented through a user interface 532 of the application 510. For example, once the user interacts with the notification 528A, the client device 110 can be configured to launch the application 510 and present the display 532A through the application 510. Alternatively, in other instances, the client device 110 can present the display 532A as a pop-up window that runs in the operating system of the client device 110 and without launching the application 510.

In some implementations, the application 510 adjusts display of the information card 522 on the client device 110 based monitoring location data for the client device 110 after presenting the display 532A. For example, the application 510 can configure the client device 110 to only display the information card 522 while the location data 502 indicates that the client device 110 is within a threshold proximity to John's device, e.g., 100 meters. If the client device 110 moves away from John's device and is no longer within the threshold proximity, then the application 150 can configure the client device 110 to remove the notification 528A and/or the display 532A since they are no longer relevant to the present location of the client device 110. In this manner, the application 510 can dynamically monitor location data to determine if other more relevant information cards should be presented on the client device 110 based on the location of the client device 110.

The location monitoring techniques depicted in FIG. 5 can be performed using other types of information sources. In some implementations, connection events between the client device 110 and beacons placed in specified locations can be monitored and used in addition to, or in lieu of, the location data 502, to output information cards on the client device 110. For example, a beacon placed in a specified location can be associated with a set of information cards of entities associated with the specified location. Once a connection event has occurred between the client device and the beacon (e.g., the client device 110 detecting beacon data transmitted or broadcasted by the beacon), the application 510 can output one or more information cards that are included in the set of information cards. In this example, the application 510 monitors for the presence of the beacon and uses detected connection events to determine that the user is nearby the specified location associated with the beacon.

Figure 6:
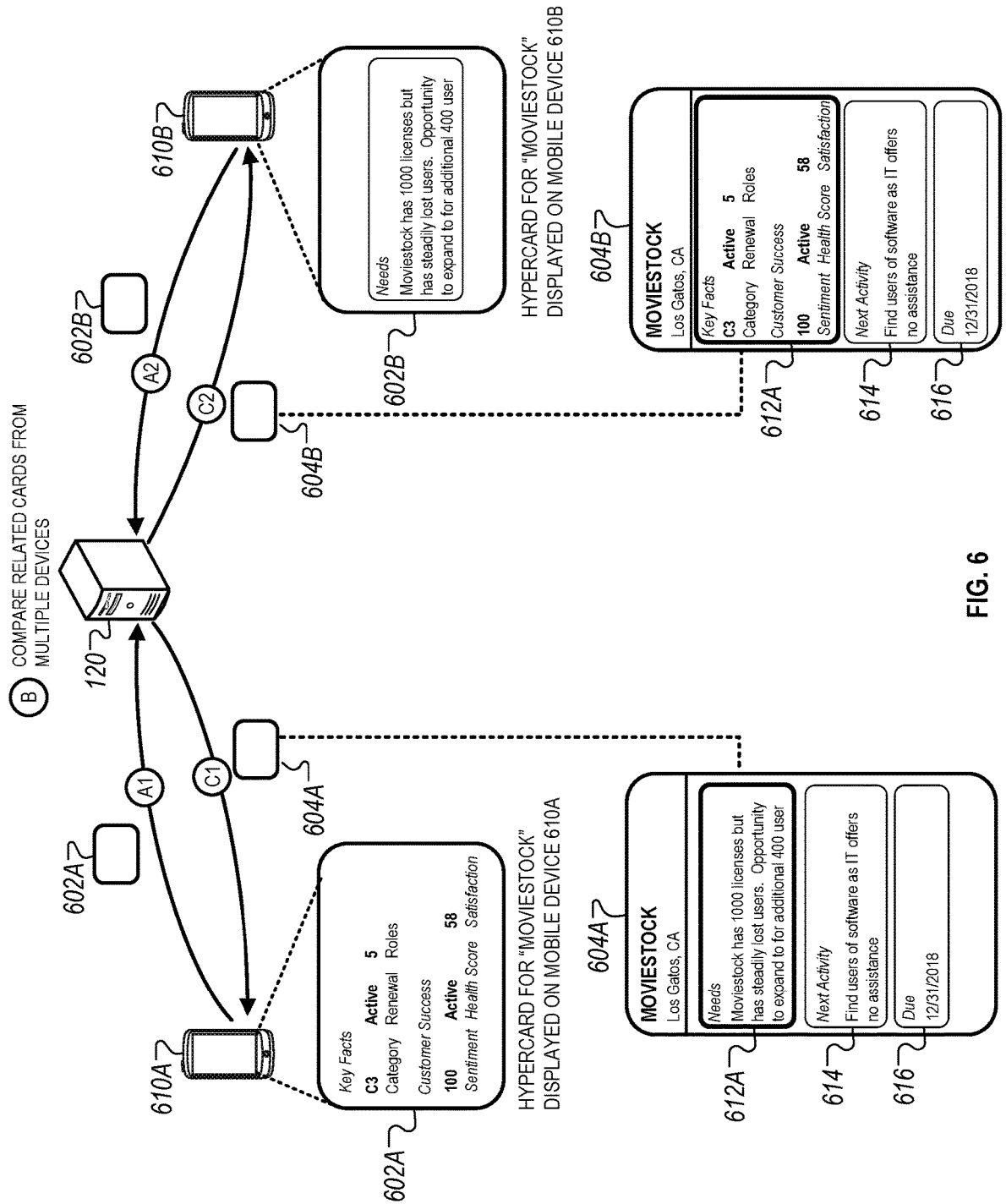
FIG. 6 illustrates an example of a technique for dynamically generating information cards for multiple users.

FIG. 6 illustrates an example of a technique for dynamically generating information cards for multiple users. In this example, users of two client devices 610A and 610B are provided with different information cards relating to the same entity and the server 120 evaluates the information cards to see if the users would benefit from being provided with information cards with additional entity information not included in the previously provided information cards.

In stages (A1) and (A2), the server 120 provides information card 602A to client device 610A and information card 602B to client device 610B. The information cards 602A and 602B include different subsets of information for the same entity "MOVIESTOCK." Information card 602A includes information relating to key facts for the entity whereas information card 602B includes information relating to needs of the entity. The information cards 602A and 602B include different subsets of information because they may have been provided by the server 120 based on different actions or trigger conditions being detected at the client devices 610A and 610B. For example, the information card 602A could have been provided to the client device 610A based on a search query for key facts received at the client device 610A, whereas the information card 602B could have been provided to the client device 610B based on an upcoming calendar appointment with a representative from "Moviestock" to discuss business opportunities.

In stage (B), the server 120 compares information cards 602A and 602B that were previously provided to client device 610A and 610B and determines whether there are any differences in the information that they include. The server 120 can compare information fields included in each of the information cards, and values for corresponding information fields, e.g., characters, values, to determine the information that is not included in each card, the information that is included in both cards, or information that varies between the two cards.

In stage (C), the server 120 generates additional cards based on the comparison and provides additional cards to each client device. In FIG. 6, the server 120 provides information card 604A to client device 610A and provides information card 604B to client device 610B. The information cards 604A and 604B each include additional information not previously included in information cards 602A and 602B. Specifically, the information card 602A includes a field 612A that includes needs of the entity that was not included in the information card 602A but was included in the information card 602B. In the same fashion, the information card 602B includes a field 612B that includes key facts of the entity that was not included in the information card 602B but was included in the information card 602A. The information cards 604A and 604B therefore provide supplemental entity information that the server 120 determines may be of interest to a user based on related cards provided to other users. The information cards 604A and 604B also include fields 614 and 616 that were not included in either of the information cards 604A and 604B. The fields 614 and 616 can include entity information that was added to the source database 122 after the information cards 602A and 602B were generated that the server 120 determines may be of interest to users based on the prior information cards provided to client devices 610A and 6106.

Implementations of the concepts disclosed herein and all of the functional operations described in this specification may be implemented in digital electronic circuitry, or in computer software, firmware, or hardware, including the structures disclosed in this specification and their structural equivalents, or in combinations of one or more of them. Implementations of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, Implementations of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular Implementations of the invention. Certain features that are described in this specification in the context of separate Implementations may also be implemented in combination in a single implementation. Conversely, various features that are described in the context of a single implementation may also be implemented in multiple Implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the Implementations described above should not be understood as requiring such separation in all Implementations, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular Implementations of the invention have been described. Other Implementations are within the scope of the following claims. For example, the actions recited in the claims may be performed in a different order and still achieve desirable results.

What is claimed is:

1. A method performed by a computing device, the method comprising:
   monitoring, using software of the computing device, data generated by the computing device that indicates one or more notifications issued by the computing device for presentation on a user interface of the computing device;
   based on the monitoring, detecting, using software of the computing device, that the computing device issued a first notification for a calendar appointment, wherein the first notification for the calendar appointment is presented on a lock screen of the computing device;
   determining, using software of the computing device, that text corresponding to the calendar appointment includes a term associated with a particular entity;
   obtaining, using software of the computing device, data for an information card for the particular entity, wherein the information card comprises additional information from a database that describes the particular entity and is not included in the calendar appointment; and
   in response to (i) detecting that the computing device issued the first notification for presentation and (ii)

determining that the text corresponding to the calendar appointment includes the term associated with the particular entity:
causing, using software of the computing device, the computing device to automatically display, separate from the first notification for the calendar appointment and not as a response to user interaction with the user interface, a second notification for the information card such that the second notification for the information card is displayed on the lock screen concurrently with the first notification for the calendar appointment, wherein the second notification is configured to initiate display of the information card for the particular entity in response to user interaction with the second notification.

2. The method of claim 1, further comprising:
receiving, by the computing device, an indication that a user has selected the second notification for the information card; and
in response to receiving the indication and after the user has logged into the computing device, causing, by the computing device, the computing device to display the information card.

3. The method of claim 1, wherein the method further comprises, in response to determining that the text corresponding to the calendar appointment includes the term associated with the particular entity:
selecting, by the computing device, a template for the information card from among a plurality of templates that each specify a different information card format for a different type of entity; and
generating, by the one or more computing device, the information card based on the template selected for the information card and information for the particular entity obtained for each of multiple fields indicated in the selected template.

4. The method of claim 1, wherein:
the computing device is monitored by an application that runs on the computing device;
the application is configured to detect actions performed by the computing device that use calendar data for a user; and
the application determines that the text corresponding to the calendar appointment includes the term associated with the particular entity.

5. The method of claim 1, wherein the first notification for the calendar appointment includes an identifier for the particular entity for which information is provided in the information card.

6. The method of claim 1, wherein determining that text corresponding to the calendar appointment includes a term associated with a particular entity comprises determining that text of the first notification for the calendar appointment includes a name of the particular entity.

7. The method of claim 1, wherein detecting that the computing device issued the first notification comprises detecting presentation of the first notification for the calendar appointment on the user interface of the computing device.

8. The method of claim 1, wherein obtaining the data for the information card comprises:
sending, by the computing device, a request to a server system over a communication network, wherein the request identifies the particular entity; and
receiving, by the computing device, response data provided over the communication network by the server system in response to the request, the response data including the information related to the particular entity for presentation in the information card.

9. The method of claim 8, wherein the request includes a user identifier for a user of the computing device or a device identifier for the computing device; and
wherein content of the response data is determined based on the user identifier or the device identifier in order to customize the information card for the user.

10. The method of claim 1, further comprising determining that a current time is within a predetermined threshold amount of time of a start time for the calendar appointment,
wherein causing the computing device to automatically display the second notification for the information card is performed in response to determining that the current time is within the predetermined threshold amount of time of a start time for the calendar appointment.

11. The method of claim 1, wherein obtaining the data for the information card comprises obtaining values, determined for the particular entity from contents of a database, for a predetermined set of information fields.

12. The method of claim 11, comprising selecting a template for the information card based on the particular entity,
wherein obtaining values for the predetermined set of information fields comprises obtaining values for a predetermined set of information fields specified by the template for the information card.

13. The method of claim 1, wherein determining that text corresponding to the calendar appointment includes a term associated with a particular entity comprises determining, from calendar data for the calendar appointment, that text of the calendar appointment includes the term associated with the particular entity.

14. The method of claim 1, wherein the first notification for the calendar appointment is a reminder notification for the calendar appointment, wherein the reminder notification is generated by the computing device based on calendar data specifying appointments of a user of the computing device.

15. The method of claim 1, wherein the first notification for the calendar appointment is generated by a first application of the computing device,
wherein the second notification for the information card is provided by a second application of the computing device, and
wherein the second application is configured to (i) detect calendar appointment reminders issued by the first application for presentation to a user and (ii) provide separate, supplemental notifications for information cards determined to be relevant to the calendar appointment reminders, wherein the supplemental notifications from the second application are triggered by detection of the calendar appointment reminders issued by the first application.

16. A system comprising:
a computing device; and
one or more storage devices storing instructions that, when executed by the computing device, cause the system to perform operations comprising:
monitoring, using software of the computing device, data generated by the computing device that indicates one or more notifications issued by the computing device for presentation on a user interface of the computing device;
based on the monitoring, detecting, using software of the computing device, that the computing device issued a first notification for a calendar appointment, wherein the first notification for the calendar appointment is presented on a lock screen of the computing device;

determining, using software of the computing device, that text corresponding to the calendar appointment includes a term associated with a particular entity;

obtaining, using software of the computing device, data for an information card for the particular entity, wherein the information card comprises additional information from a database that describes the particular entity and is not included in the calendar appointment; and in response to (i) detecting that the computing device issued the first notification for presentation on the user interface of the computing device and (ii) determining that the text corresponding to the calendar appointment includes the term associated with the particular entity:

causing, using software of the computing device, the computing device to automatically display, separate from the first notification for the calendar appointment and not as a response to user interaction with the user interface, a second notification for the information card such that the second notification for the information card is displayed on the lock screen concurrently with the first notification for the calendar appointment, wherein the second notification is configured to initiate display of the information card for the particular entity in response to user interaction with the second notification.

17. One or more non-transitory computer-readable media storing instructions that are operable, when executed by a computing device, to cause the computing device to perform operations comprising:

monitoring, using software of the computing device, data generated by the computing device that indicates one or more notifications issued by the computing device for presentation on a user interface of the computing device;

based on the monitoring, detecting, using software of the computing device, that the computing device issued a first notification for a calendar appointment, wherein the first notification for the calendar appointment is presented on a lock screen of the computing device;

determining, using software of the computing device, that text corresponding to the calendar appointment includes a term associated with a particular entity;

obtaining, using software of the computing device, data for an information card for the particular entity, wherein the information card comprises additional information from a database that describes the particular entity and is not included in the calendar appointment; and in response to (i) detecting that the computing device issued the first notification for presentation on the user interface of the computing device and (ii) determining that the text corresponding to the calendar appointment includes the term associated with the particular entity:

causing, using software of the computing device, the computing device to automatically display, separate from the first notification for the calendar appointment and not as a response to user interaction with the user interface, a second notification for the information card such that the second notification for the information card is displayed on the lock screen concurrently with the first notification for the calendar appointment, wherein the second notification is configured to initiate display of the information card for the particular entity in response to user interaction with the second notification.

* * * * *